US009713788B2

(12) United States Patent
Calabro et al.

(10) Patent No.: US 9,713,788 B2
(45) Date of Patent: Jul. 25, 2017

(54) NON-AQUEOUS AMINE SCRUBBING FOR REMOVAL OF CARBON DIOXIDE

(71) Applicants: David Charles Calabro, Bridgewater, NJ (US); Lisa Saunders Baugh, Ringoes, NJ (US); Pavel Kortunov, Flemington, NJ (US); Benjamin A. McCool, Annandale, NJ (US); Michael Siskin, Westfield, NJ (US); Dennis George Peiffer, Annandale, NJ (US); Quanchang Li, Dayton, NJ (US)

(72) Inventors: David Charles Calabro, Bridgewater, NJ (US); Lisa Saunders Baugh, Ringoes, NJ (US); Pavel Kortunov, Flemington, NJ (US); Benjamin A. McCool, Annandale, NJ (US); Michael Siskin, Westfield, NJ (US); Dennis George Peiffer, Annandale, NJ (US); Quanchang Li, Dayton, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 139 days.

(21) Appl. No.: 14/885,214

(22) Filed: Oct. 16, 2015

(65) Prior Publication Data
US 2016/0038872 A1 Feb. 11, 2016

Related U.S. Application Data

(62) Division of application No. 13/228,652, filed on Sep. 9, 2011, now Pat. No. 9,186,617.
(Continued)

(51) Int. Cl.
C07C 215/18 (2006.01)
C07C 215/12 (2006.01)
(Continued)

(52) U.S. Cl.
CPC ..... *B01D 53/1493* (2013.01); *B01D 53/1475* (2013.01); *B01D 53/62* (2013.01);
(Continued)

(58) Field of Classification Search
None
See application file for complete search history.

(56) References Cited

U.S. PATENT DOCUMENTS 3,347,621 A    10/1967 Papadopoulos et al.
3,794,586 A    2/1974 Kimura et al.
(Continued)

FOREIGN PATENT DOCUMENTS

CN    1354036 A    6/2002
CN    101279181 A    10/2008
(Continued)

OTHER PUBLICATIONS

Tossell, "Catching CO2 in a Bowl", Inorganic Chemistry, Jun. 25, 2009, pp. 7105-7110, vol. 48, American Chemical Society.
(Continued)

*Primary Examiner* — Daniel Berns
(74) *Attorney, Agent, or Firm* — Andrew T. Ward

(57) ABSTRACT

A method is described for separating $CO_2$ and/or $H_2S$ from a mixed gas stream by contacting the gas stream with a non-aqueous, liquid absorbent medium of a primary and/or secondary aliphatic amine, preferably in a non-aqueous, polar, aprotic solvent under conditions sufficient for sorption of at least some of the $CO_2$. The solution containing the absorbed $CO_2$ can then be treated to desorb the acid gas. The method is usually operated as a continuous cyclic sorption-desorption process, with the sorption being carried out in a sorption zone where a circulating stream of the liquid absorbent contacts the gas stream to form a $CO_2$-rich sorbed solution, which is then cycled to a regeneration zone for
(Continued)

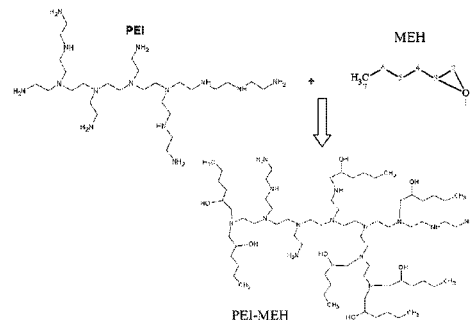

Schematic reaction of PEI with MEH to form oligomer with ~3:3:8 1°/2°/3° amine ratio desorption of the CO$_2$ (advantageously at <100° C.). Upon CO$_2$ release, the regenerated lean solution can be recycled to the sorption tower. CO$_2$:(primary+secondary amine) adsorption molar ratios>0.5:1 (approaching 1:1) may be achieved.

2 Claims, 11 Drawing Sheets

Related U.S. Application Data

(60) Provisional application No. 61/381,351, filed on Sep. 9, 2010, provisional application No. 61/381,281, filed on Sep. 9, 2010, provisional application No. 61/381,294, filed on Sep. 9, 2010, provisional application No. 61/420,960, filed on Dec. 8, 2010, provisional application No. 61/420,978, filed on Dec. 8, 2010, provisional application No. 61/421,048, filed on Dec. 8, 2010.

(51) Int. Cl.
 *C07C 215/14* (2006.01)
 *C07C 211/14* (2006.01)
 *B01D 53/14* (2006.01)
 *B01D 53/62* (2006.01)

(52) U.S. Cl.
 CPC ............... *B01D 2252/2056* (2013.01); *B01D 2252/20415* (2013.01); *B01D 2252/20421* (2013.01); *B01D 2252/20426* (2013.01); *B01D 2252/20431* (2013.01); *B01D 2252/20478* (2013.01); *B01D 2252/30* (2013.01); *Y02C 10/04* (2013.01); *Y02C 10/06* (2013.01)

(56) References Cited

U.S. PATENT DOCUMENTS

| | | | |
|---|---|---|---|
| 4,100,257 A | 7/1978 | Sartori et al. | |
| 4,112,051 A | 9/1978 | Sartori et al. | |
| 4,410,335 A | 10/1983 | Childs | |
| 4,474,682 A | 10/1984 | Billenstein et al. | |
| 4,624,838 A | 11/1986 | Pan et al. | |
| 4,636,323 A | 1/1987 | Nagai et al. | |
| 5,057,122 A | 10/1991 | Blain et al. | |
| 5,068,046 A | 11/1991 | Blain et al. | |
| 5,565,145 A | 10/1996 | Watson et al. | |
| 5,603,908 A | 2/1997 | Yoshida et al. | |
| 5,879,433 A | 3/1999 | Gallup et al. | |
| 6,075,000 A | 6/2000 | Rohrbaugh et al. | |
| 6,140,276 A | 10/2000 | Duncum et al. | |
| 6,579,343 B2 | 6/2003 | Brennecke et al. | |
| 6,586,106 B2 | 7/2003 | Shibuya et al. | |
| 2002/0189444 A1 | 12/2002 | Brennecke et al. | |
| 2004/0035293 A1 | 2/2004 | Davis, Jr. | |
| 2005/0129598 A1 | 6/2005 | Chinn et al. | |
| 2005/0183337 A1 | 8/2005 | Cadours et al. | |
| 2005/0239974 A1 | 10/2005 | Grimm et al. | |
| 2005/0257421 A1 | 11/2005 | Siggelkow et al. | |
| 2006/0188423 A1 | 8/2006 | Cadours et al. | |
| 2006/0251558 A1 | 11/2006 | Chinn et al. | |
| 2007/0286783 A1 | 12/2007 | Carrette et al. | |
| 2008/0004362 A1 | 1/2008 | Masuda et al. | |
| 2008/0025893 A1 | 1/2008 | Asprion et al. | |
| 2008/0050296 A1 | 2/2008 | Tontiwachwuthikul et al. | |
| 2008/0141858 A1 | 6/2008 | Liu et al. | |
| 2008/0187485 A1 | 8/2008 | Magne-Drisch et al. | |
| 2009/0136402 A1 | 5/2009 | Heldebrant et al. | |
| 2009/0263302 A1 | 10/2009 | Hu | |
| 2009/0291874 A1 | 11/2009 | Bara et al. | |
| 2010/0288126 A1 | 11/2010 | Agar et al. | |
| 2011/0226697 A1* | 9/2011 | McLellan | B01D 53/62 210/651 |
| 2011/0293498 A1 | 12/2011 | Lahary et al. | |

FOREIGN PATENT DOCUMENTS

| | | |
|---|---|---|
| DE | 3504538 A | 9/1985 |
| DE | 102008007087 A1 | 8/2009 |
| DE | 102008013738 A1 | 9/2009 |
| EP | 0349787 B1 | 8/1994 |
| FR | 2918386 A1 | 7/2007 |
| GB | 1473103 A | 5/1977 |
| JP | 56145984 A | 11/1981 |
| JP | 61225293 A | 10/1986 |
| JP | 2003193385 A | 7/2003 |
| JP | 2005126279 A | 5/2005 |
| JP | 2006150298 A | 6/2006 |
| JP | 2007197503 A | 8/2007 |
| WO | 2006103812 A1 | 10/2006 |
| WO | 2007003618 A1 | 1/2007 |
| WO | 200807320 A3 | 1/2008 |
| WO | 2008015217 A1 | 2/2008 |
| WO | 2008068411 A2 | 6/2008 |
| WO | 2008094846 A1 | 8/2008 |
| WO | 2010089257 A1 | 8/2010 |

OTHER PUBLICATIONS

Zhou et al., "N-Heterocyclic Carbene Functionalized Polymer for Reversible Fixation—Release of CO2", Macromolecules, Jul. 20, 2009, pp. 5419-5421, vol. 42, American Chemical Society.
Ito, "Formation of Carbamic Acids and Their Photochemistry", Kokagaku Kyokai, 2002, pp. 205-212, vol. 33, No. 3.
Imaishi et al., "Chemical absorption of carbon dioxide by non-aqueous solutions of cyclohexylamine", Kagaku Kogaku Robunshu, 1981, pp. 261-266, vol. 7, No. 3, English abstract only.
Wan et al., "Can Nonspecific Host-Guest Interaction lead to Highly Specific Encapsulation by a Supramolecular Nanocapsule?", Macromolecules, Jun. 26, 2009, pp. 6448-6456, vol. 42, American Chemical Society.
Yushko et al., "Effect of water content on the solubility of carbon dioxide in solutions of monoethanolamine in sulfolane", Voprosy Khimii I Khimicheskoi Tekhnologii, 1973, pp. 3-5, vol. 30, English abstract only.
Sada et al., "Chemical Absorption of Carbon Dioxide into Ethanolamine Solutions of Polar Solvent", AIChE Journal, Feb. 1986, pp. 347-349, vol. 32, No. 2, John Wiley & Sons, Inc.
Yogish "Absorption of CO2 in Some Hybrid Solvents", Canadian Journal of Chemical Engineering, Jun. 1990, pp. 511-512, vol. 68, John Wiley & Sons, Inc.
Kumar et al., "New absorption liquids for the removal of CO2 from dilute gas streams using membrane contactors", Chemical Engineering Science, 2002, pp. 1639-1651, vol. 57, Pergamon, Elsevier.
Takeshita et al., "Relation between separation factor of carbon isotope and chemical reaction of carbon dioxide with amine in nonaqueous solvent", Journal of Chemical Engineering of Japan, 1989, pp. 447-454, vol. 22, No. 5, English abstract only.
Takeshita et al., "Chemical equilibria of absorption of carbon dioxide into nonaqueous solution of amine", Journal of Chemical Engineering of Japan, 1988, pp. 411-417, vol. 21, No. 4, English abstract only.
Versteeg et al., "On the Kinetics Between CO2 and Alkanolarnines Both in Aqueous and Non-Aqueous Solutions—II. Tertiary Amines", Chemical Engineering Science, 1988, pp. 587-591, vol. 43, No. 3, Pergamon Journals Ltd.
Rivas, "Solvent selectivity for the purification of natural gases", Ph.D. Thesis, University of California, Berkeley, Jan. 1, 1978, abstract only.
Xu et al., "Kinetics of the Reaction of Carbon Dioxide with 2-Amino-2-methyl-1-propanol Solutions", Chemical, Engineering Science, 1996, pp. 841-850, vol. 51, No. 6, Pergamon, Elsevier Science Ltd.
Littell et al., "Physical absorption into non-aqueous solutions in a stirred cell reactor", Chemical Engineering Science, 1991, pp. 3308-3313, vol. 46, No. 12, Pergamon Press.
Leites et al., "Removal of carbon dioxide from gas by solutions of monoethanolarnine in various diluents", Khimicheskaya Promyshlennost, 1975, pp. 599-602, vol. 8, English abstract only.

(56) References Cited

OTHER PUBLICATIONS

Takeshita et al., "Separation of carbon isotopes by using the chemical reaction of carbon dioxide with amines in nonaqueous solution", Kagaku Kogaku, 1990, pp. 426-428, vol. 55, iss. 6.

Liang et al., "Unimolecular Micelle Derived from hyperbranched Polyethyleneimine with Well-Defined Hybrid Shell of Poly(ethylene oxide) and Polystyrene: A Versatile Nanocapsule", Journal of Polymer Science: Park A: Polymer Chemistry, 2010, pp. 681-691, vol. 43, Wiley Periodicals, Inc.

Bates et al., "CO2 Capture by a Task-Specific Ionic Liquid", Journal of the American Chemical Society, Jan. 19, 2002, pp. 926-927, vol. 124, No. 6, American Chemical Society.

Dinda et al., "Kinetics of reactive absorption of carbon dioxide with solutions of aniline in carbon tetrachloride and chloroform", Chemical Engineering Journal, 2008, pp. 349-357, vol. 136, Elsevier.

Smiglak et al., "Ionic liquids via reaction of the zwitterionic 1,3-dimethylimidazolium-2-carboxylate with protic acids. Overcoming synthetic limitations and establishing new halide free protocols for the formation of ILs", Green Chemistry, Dec. 5, 2006, pp. 90-98, vol. 9, Royal Society of Chemistry.

Voutchkova et al., "Imidazolium Carboxylates as Versatile and Selective N-Heterocyclic Carbene Transfer Agents: Synthesis, Mechanism, and Applications", Journal of the American Chemical Society, Sep. 27, 2007, pp. 12834-12848, vol. 129, American Chemical Society.

Tommasi et al., "Synthesis of 1,3-diaikylimidazolium-2-carboxylates by direct carboxylation of 1,3-dialkylimidazolium chlorides with CO2", Tetrahedron Letters, Jun. 21, 2006, pp. 6453-6456, vol. 47, Elsevier.

Duong et al., "Reversible carboxylation of N-heterocyclic carbenes", Chemical Communications, Nov. 10, 2003, pp. 112-113, Royal Society of Chemistry.

Tudose et al., "Imidazol(in)ium-2-carboxylates as N-heterocyclic carbene precursors in ruthenium-arene catalysts for olefin metathesis and cyclopropanation", Journal of Organometallic Chemistry, Aug. 4, 2006, pp. 5356-5365, vol. 691, Elsevier.

Bridges et al., "An Intermediate for the Clean Synthesis of Ionic Liquids: Isolation and Crystal Structure of 1,3-Dimethylimidazolium Hydrogen Carbonate Monohydrate", Chemistry, A European Journal, 2007, pp. 5207-5212, vol. 13, Wiley-VCH Verlag GmbH & Co.

Zhou et al., "CO2 Adducts of N-Heterocyclic Carbenes: Thermal Stability and Catalytic Activity toward the Coupling of CO2 with Epoxides", Journal of Organic Chemistry, Sep. 13, 2008, pp. 8039-8044, vol. 73, American Chemical Society.

Sada et al., "Reaction Kinetics of Carbon Dioxide with Amines in Non-aqueous Solvents", Chemical Engineering Journal, 1986, pp. 87-95, vol. 33, Elsevier Sequoia.

Carvalho et al., "Specific Solvation Interactions of CO2 on Acetate and Trifluoroacetate Imidazolium Based Ionic Liquids at High Pressures", Journal of Physical Chemistry B, Apr. 17, 2009, pp. 6803-6812, vol. 113, American Chemical Society.

Cadena et al., "Why is CO2 So Soluble in Imidazolium-Based Ionic Liquids?", Journal of American Chemical Society, Mar. 31, 2004, pp. 5300-5308, vol. 126, American Chemical Society.

Yokozeki et al., "Physical and Chemical Absorptions of Carbon Dioxide in Room-Temperature Ionic Liquids", Journal of Physical Chemistry B, Dec. 3, 2008, pp. 16654-16663, vol. 112, American Chemical Society.

Shiflett et al., "Phase behavior of {carbon dioxide + [bmim][Ac]} mixtures", Journal of Chemical Thermodynamics, Jun. 12, 2007, pp. 25-31, vol. 40. Elsevier.

MaGinn, "Design and Evaluation of Ionic Liquids as Novel CO2 Absorbents", University of Notre Dame Quarterly Technical Report, May 31, 2005, DOE Award No. DE-FG26-04NT42122.

Dijkstra et al., "Formation of carbamic add in organic solvents and in supercritical carbon dioxide", Journal of Supercritical Fluids, 2007, pp. 109-114, vol. 41, Elsevier.

Masuda et al., "Studies on the solvent dependence of the carbarnic acid formation from omega-(1-naphthyl)alkylamines and carbon dioxide", Tetrahedron, Nov. 5, 2005, pp. 213-229, vol. 61, Elsevier.

Hampe et al., "Reversible covalent chemistry of CO2", Chemical Communications, Jun. 13, 2002, pp. 1450-1451, Royal Society of Chemistry.

Heldebrant et al., "CO2-Binding Organic Liquids (CO2BOLs) for Add Gas Capture", Pacific Northwest Laboratory.

Jessop et al., "Reversible nonpolar-to-polar solvent", Nature, Aug. 25, 2005, pp. 1102, vol. 436, Nature Publishing Group.

Heldebrant et al., "Organic liquid CO2 capture agents with high gravimetric CO2 capacity", Energy & Environmental Science, 2008, pp. 487-493, vol. 1, Royal Society of Chemistry.

Phan et al., "Switchable Solvents Consisting of Amidine/Alcohol or Guanidine/Alcohol Mixtures", Industrial & Engineering Chemistry Research, Sep. 5, 2007, pp. 539-545, vol. 47, American Chemical Society.

Hampe at al, "Exploring reversible reactions between CO2 and amines", Tetrahedron, 2003, pp. 9619-9625, vol. 59, Pergamon.

Kayaki et al., "Utilization of $N_xN$-Dialkylcarbarnic Acid Derived from Secondary Amines and Supercritical Carbon Dioxide: Stereoselective Synthesis of Z Alkenyl Carbamates with a CO2-Soluble Ruthenium-P(OC2H5)3 Catalyst", Chemistry, An Asian Journal, 2008, pp. 1865-1870, vol. 3, Wiley-VCH Verlag GmbH.

Sada et al., "Chemical Kinetics of the Reaction of Carbon Dioxide with Ethanolamines in Nonaqueous Solvents", AiChE Journal, Aug. 1985, pp. 1297-1303, vol. 31, No. 8, John Wiley & Sons, Inc.

Heldebrant et al., "CO2-binding organic liquids (CO2BOLs) for post-combustion CO2 capture", Energy Procedia, 2009, pp. 1187-1195, vol. 1, Elsevier.

Versteeg et al., "On the Kinetics Between CO2 and Alkanolamines both in Aqueous and Non-Aqueous Solutions. An Overview", Chemical Engineering Communications, 1996, pp. 113-158, vol. 144, Overseas Publisher Association.

Versteeg & W.P.M. Van Swaaij, "On the Kinetics Between CO2 and Alkanolamines Both in Aqueous and Non-Aqueous Solutions—I. Primary and Secondary Amines", Chemical Engineering Science, 1988, pp. 573-585, vol. 43, No. 3, Pergamon Journals Ltd.

Davis et al., "Kinetics of the Reaction of Carbon Dioxide With Secondary Amines in Polyethylene Glycol", Chemical Engineering Science, 1993, pp. 3187-3193, vol. 48, No. 18, Pergamon Press Ltd.

Bara et al., "Gas Processing With Ionic Liquid-Amine Solvents", URS Corporation (Denver, Colorado), 2010.

Kim et al., "Reversible, solid state capture of carbon dioxide by hydroxylated amidines", Chemical Communications, Feb. 1, 2010, pp. 2507-2509, vol. 46, Royal Society of Chemistry.

MaGinn et al., "Development of new post-combustion carbon dioxide capture solvents: Are ionic liquids the answer?", 235th ACS National Meeting, Apr. 6-10, 2008, abstract.

Dinda et al., "Kinetics of Reactive Absorption of Carbon Dioxide and Solutions of Aniline in Nonaqueous Aprotic Solvents", Ind. Eng. Chem. Res., 2006, pp. 6832-6639, vol. 45, American Chemical Society.

Camper et al., "Room-Temperature Ionic Liquid-Amine Solutions: Tunable Solvents for Efficient and Reversible Capture of CO2", Industrial & Engineering Chemistry Research, Oct. 8, 2008, pp. 8496-8498, vol. 47, American Chemical Society.

Bara et al., "Guide to CO2 Separations in Imidazolium-Based Room-Temperature Ionic Liquids", Industrial & Engineering Chemistry Research, Feb. 11, 2009, pp. 2739-2751, vol. 48, American Chemical Society.

Holbrey et al., "1,3-Dimethylimidazolium-2-carboxylate: the unexpected synthesis of an ionic liquid precursor and carbene-CO2 adduct", Chemical Commununications, 2003, pp. 28-29, Royal Society of Chemisty.

Karadas et al., "Review on the Use of Ionic Liquids (ILs) as Alternative Fluids for CO2 Capture and Natural Gas Sweetening", Energy & Fuels, Oct. 18, 2010, pp. 5817-528, vol. 24, American Chemical Society.

McGhee et al., "Palladium-Catalyzed Generation of O-Allylic Urethanes and Carbonates from Amines/Alcohols, Carbon Dioxide, and Allylic Chlorides", Organometallics, 1993, pp. 1429-1433, vol. 12, American Chemical Society.

(56) References Cited

OTHER PUBLICATIONS

Yamada et al., "Reversible, Room-Temperature Ionic Liquids. Amidinium Carbamates Dervied from Amidines and Aliphatic Primary Amines with Carbon Dioxide", Chemistry of Materials, 2007, pp. 967-969, vol. 19, American Chemical Society.

Yamada et al., "Reversible, Room-Temperature Chiral ionic Liquids. Amidinium Carbamates Dervied from Amidines and Amino-Acid Esters with Carbon Dioxide", Chemistry of Materials, 2007, pp. 4761-4768, vol. 19, American Chemical Society.

Yu et al., "Carbon Dioxide and Molecular Nitrogen as Switches between Ionic and Uncharged Room-Temperature Liquids Comprised of Amidines and Chiral Amino Alcohols", Chemistry of Materials, 2008, pp. 5337-4534, vol. 20, American Chemical Sociely.

Perez et al., "Activation of Carbon Dioxide by Bicyclic Amidines", Journal of Organic Chemistry, 2004, pp. 8005-8011, vol. 69, American Chemical Society.

Katritzky et al., "The N-Carboxylic Acids of Nitrogen Heterocycles", Heterocycles, 1987, pp. 1333-1344, vol. 26.

\* cited by examiner

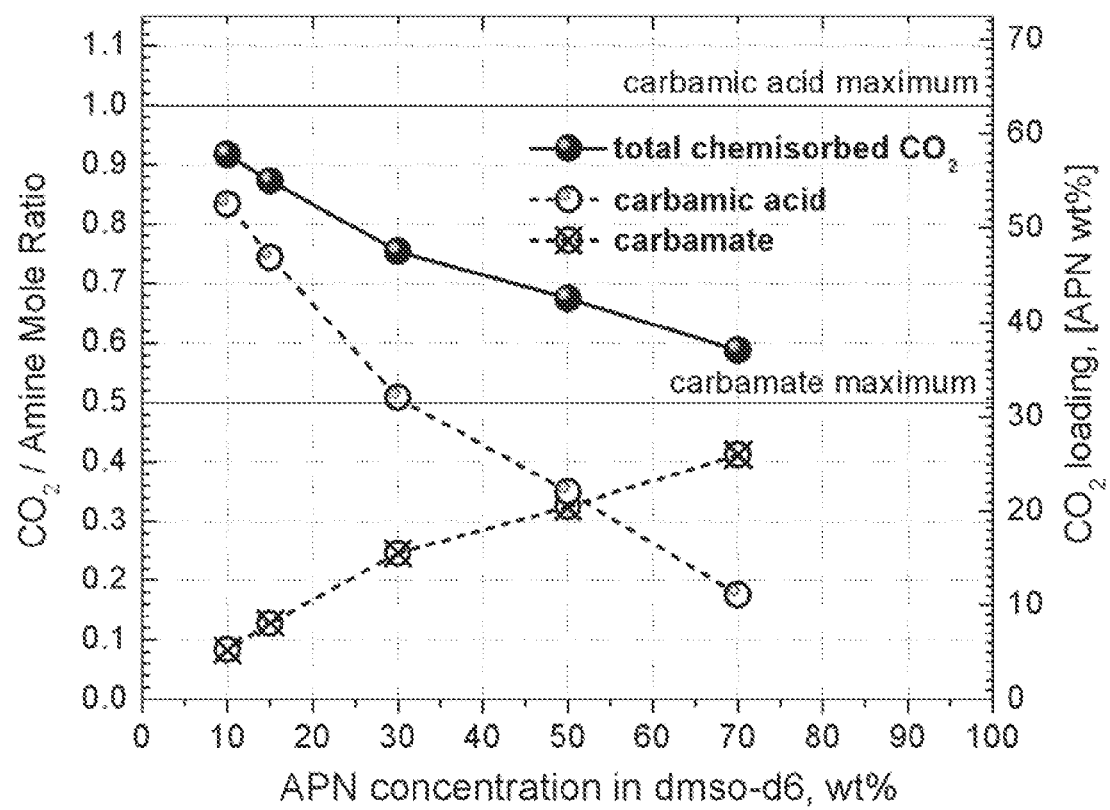
Figure 2.1
APN/ DMSO-*d*6:
CO$_2$ uptake with amine concentration

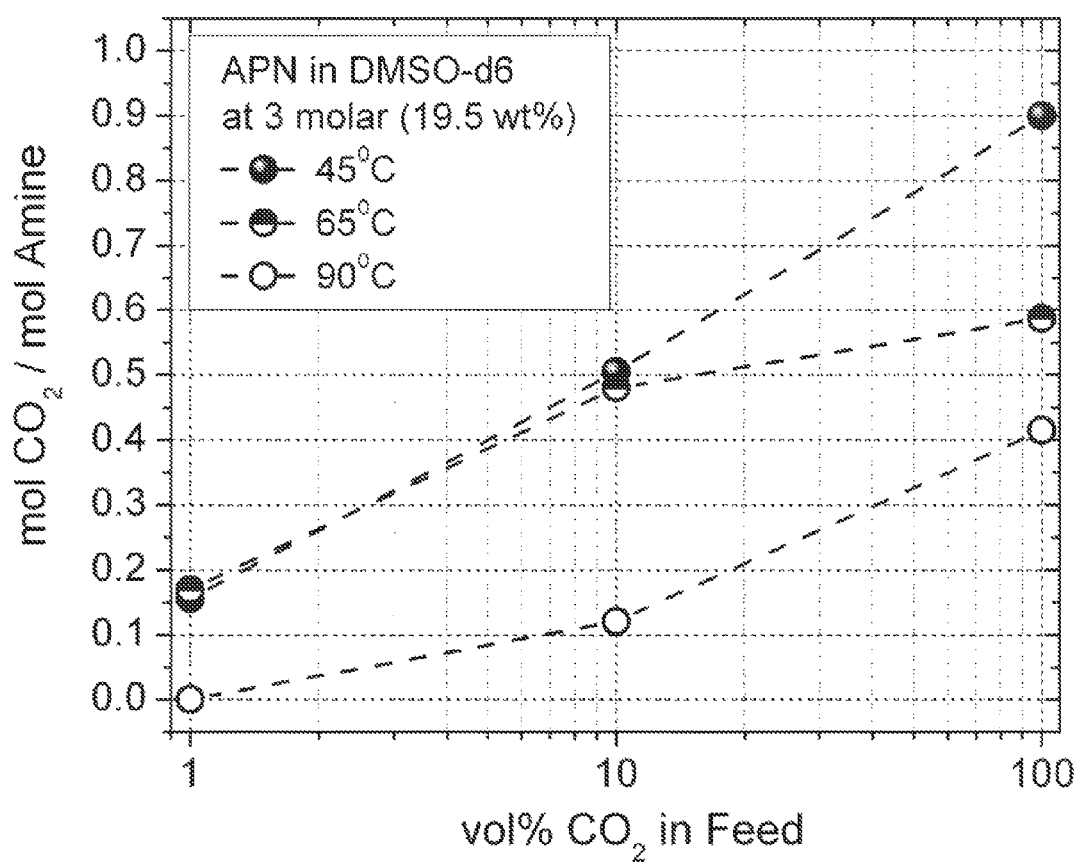
Figure 2.2
Vapor-Liquid Equilibrium for APN/$CO_2$ in DMSO-$d_6$

2EEA/ DMSO-*d*6:

CO$_2$ uptake with amine concentration $CO_2$/2EEA (15 wt%) in DMSO-$d_6$ (circles), toluene-$d_8$ (triangles), and sulfolane (squares) solvents 2EEA (15 wt %)/ DMSO-$d_6$:

$CO_2$ uptake (filled circles), $CO_2$ desorption with $N_2$ purge (open circles), $CO_2$ thermal desorption (open triangles)

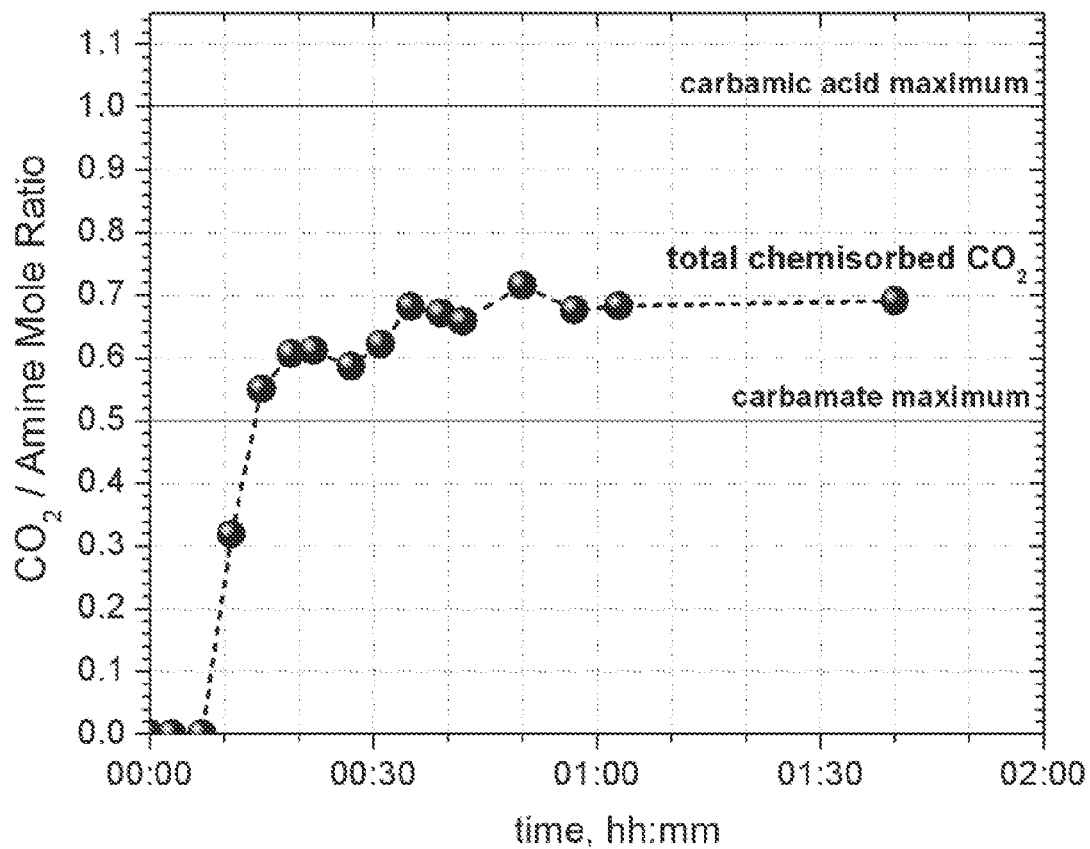
Figure 6.1
Reaction profile $CO_2$/MEA/ DMSO-$d_6$

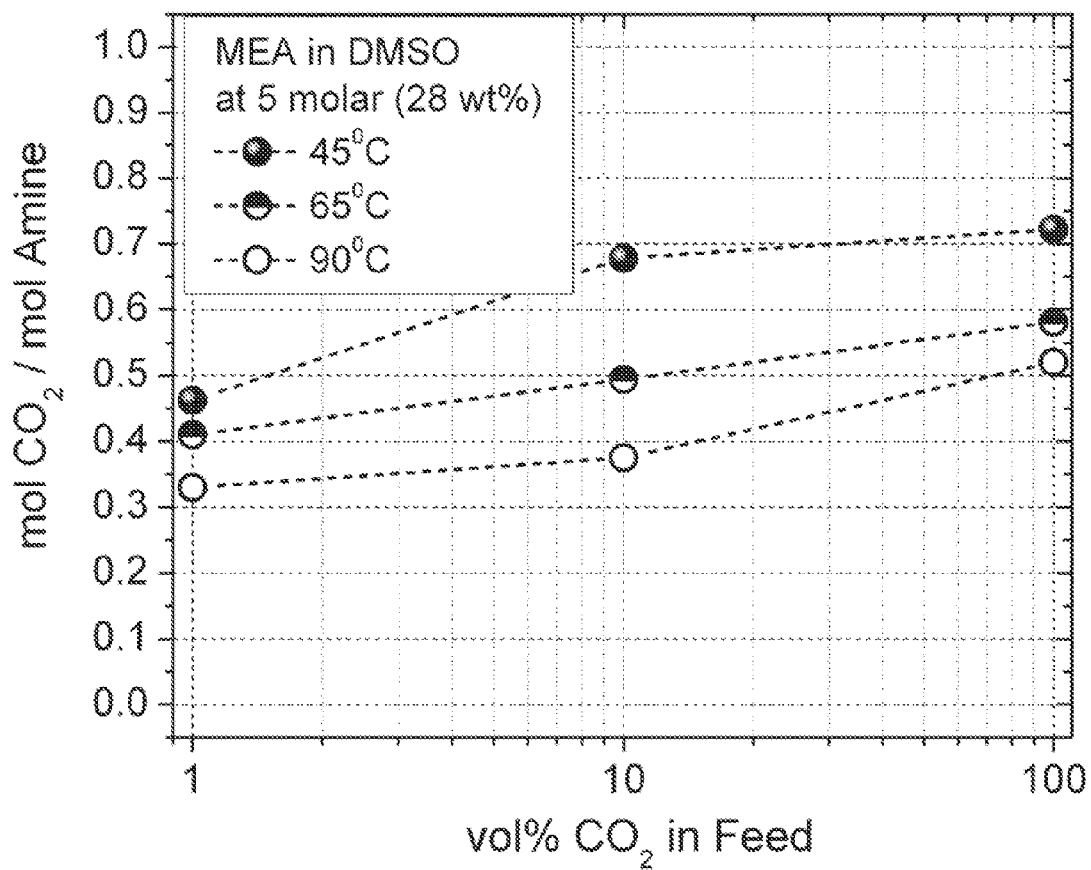
Figure 6.2
Vapor-Liquid Equilibrium for MEA/CO$_2$ in DMSO-$d_6$

BMAP (15 wt%)/DMSO-$d_6$:

$CO_2$ uptake (filled circles), $CO_2$ desorption with $N_2$ purge (open circles), $CO_2$ thermal desorption (open triangles)

15 wt% BMAP aqueous solutions:

$CO_2$ uptake (filled circles), $CO_2$ desorption with $N_2$ purge (open circles), $CO_2$ thermal desorption (open triangles)

Schematic reaction of PEI with MEH to form oligomer with ~3:3:8 1°/2°/3° amine ratio

NON-AQUEOUS AMINE SCRUBBING FOR REMOVAL OF CARBON DIOXIDE

CROSS REFERENCE TO RELATED APPLICATIONS

This application is a divisional of U.S. application Ser. No. 13/228,653 filed Sep. 9, 2011. This application claims the benefit of U.S. Provisional Application Nos. 61/381,351 filed Sep. 9, 2010, 61/381,281 filed Sep. 9, 2010, 61/381,294 filed Sep. 9, 2010, 61/420,960 filed Dec. 8, 2010, 61/420,978 filed Dec. 8, 2010, and 61/421,048 filed Dec. 8, 2010, the entire contents of each of which are hereby incorporated by reference herein.

FIELD OF THE INVENTION

This invention relates to the selective removal of $CO_2$ and/or $H_2S$ and/or other acid gases from a gaseous stream containing one or more of these gases. In particular, this disclosure relates to a method for separating carbon dioxide from gas streams using a non-aqueous amine as an absorbent.

BACKGROUND OF THE INVENTION

The removal of carbon dioxide from mixed gas streams is of great industrial importance and commercial value. Carbon dioxide is a ubiquitous and inescapable by-product of the combustion of hydrocarbons, and there is growing concern over its accumulation in the atmosphere and its potential role in a perceived global climate change. Laws and regulations driven by environmental factors may therefore soon be expected to require its capture and sequestration. While existing methods of $CO_2$ capture have been adequately satisfactory for the scale in which they have so far been used, future uses on the far larger scale required for significant reductions in atmospheric $CO_2$ emissions from major stationary combustion sources such as power stations fired by fossil fuels makes it necessary to improve the processes used for the removal of $CO_2$ from gas mixtures. According to data developed by the Intergovernmental Panel on Climate Change, power generation produces approximately 78% of world emissions of $CO_2$ with other industries such as cement production (7%), refineries (6%), iron and steel manufacture (5%), petrochemicals (3%), oil and gas processing (0.4%) and the biomass industry (bioethanol and bioenergy) (1%) making up the bulk of the total, illustrating the very large differences in scale between power generation on the one hand and all other uses on the other. To this must be added the individual problem of the sheer volumes of gas which will need to be treated: flue gases consist mainly of nitrogen from combustion air, with the $CO_2$, nitrogen oxides and other emissions such as sulfur oxides making up relatively smaller proportions of the gases which require treatment: typically, the flue gases from fossil fuel power stations typically contain from about 7 to 15 volume percent of $CO_2$, depending on the fuel, with natural gas giving the lowest amounts and hard coals the greatest.

Cyclic $CO_2$ absorption technologies such as Pressure Swing Absorption (PSA) and Temperature Swing Absorption (TSA) using liquid absorbents are well-established. The absorbents mostly used include liquid solvents, as in amine scrubbing processes, although solid sorbents are also used in PSA and TSA processes. Liquid amine absorbents, including alkanolamines, dissolved in water are probably the most common absorbents. Amine scrubbing is based on the chemical reaction of $CO_2$ with amines to generate carbonate/bicarbonate and carbamate salts: the aqueous amine solutions chemically trap the $CO_2$ via formation of one or more ammonium salts (carbamate/bicarbonate/carbonate) which are thermally unstable, enabling the regeneration of the free amine at moderately elevated temperatures. Commercially, amine scrubbing typically involves contacting the $CO_2$ and/or $H_2S$ containing gas stream with an aqueous solution of one or more simple amines (e.g., monoethanolamine (MEA), diethanolamine (DEA), methyldiethanolamine (MDEA) or triethanolamine (TEA)). The low molecular weight of MEA makes it economically attractive because sorption takes place on a molecular basis while the amine is sold on a weight basis. The cyclic sorption process requires high rates of gas-liquid exchange, the transfer of large liquid inventories between the absorption and regeneration steps, and high energy requirements for the regeneration of amine solutions. It is challenged by the corrosive nature of the amine solutions containing the sorbed $CO_2$. Without further improvement, these difficulties would limit the economic viability of the aqueous amine scrubbing processes in very large scale applications.

The cyclic absorption processes using aqueous sorbents require a large temperature differential in the gas stream between the absorption and desorption (regeneration) parts of the cycle. In conventional aqueous amine scrubbing methods relatively low temperatures, e.g., less than 50° C., are required for $CO_2$ uptake with an increase to a temperature to above about 100° C., e.g., 120° C., required for the desorption. The heat required to maintain the thermal differential is a major factor in the cost of the process, and with the need to regenerate the solution at temperatures above 100° C., the high latent heat of vaporization of the water (2260 kJ/Kg at 100° C.) obviously makes a significant contribution to the total energy consumption. If $CO_2$ capture is to be conducted on the larger scale appropriate to use in power stations, more effective and economical separation techniques need to be developed.

Another area where more efficient $CO_2$ separation processes are used is in enhanced oil recovery (EOR) where $CO_2$ is re-injected into the gas or liquid hydrocarbon deposits to maintain reservoir pressure. With the advanced age of many producing reservoirs worldwide and the ever-increasing challenge of meeting demand, the expanding use of EOR methods is becoming more widespread. Typically the source of carbon dioxide for EOR is the producing hydrocarbon stream itself, which may contain anywhere from less than 5% to more than 80% of $CO_2$. Other options are to capture $CO_2$ from the flue gases of various combustion sources and pre-combustion capture of $CO_2$ from shifted syngas produced in fuel gasification processes.

Various commercial $CO_2$ capture processes have been brought to market. The Fluor Daniel Econamine™ Process (originally developed by Dow Chemical and Union Carbide), which uses MEA for recovery of $CO_2$ from flue gases, primarily for EOR applications, has a number of operational plants. The Benfield™ Process using hot potassium carbonate is used in many ammonia, hydrogen, ethylene oxide and natural gas plants with over 675 units worldwide licensed by UOP and has been proposed for treating flue gas, notwithstanding its minimum $CO_2$ partial pressure requirement of 210-345 kPag (30-50 psig). One significant disadvantage of the Benfield Process is its use of a high temperature stripping step (175° C.) approximately 75-100° C. above the temperature of the absorption step. The Catacarb™ process, also using hot potassium carbonate, also uses high temperature stripping resulting in high energy consumption.

Processes using sterically hindered amines as alternatives to MEA, DEA, and TEA have also achieved success, including the ExxonMobil Flexsorb™ Process and the KS™ Process from Mitsubishi Heavy Industries and Kansai Electric Power Co.

Processes using solid absorbents are also known and while they may avoid many of the limitations of amine scrubbing, they suffer from a lack of absorbents having sufficiently selective $CO_2$ absorption under the conditions present in most commercial combustion flue gas processes.

SUMMARY OF THE INVENTION

This invention relates to a method of separating carbon dioxide, $CO_2$, (and/or $H_2S$) from a gas stream containing this gas, possibly with other acid gases, by contacting the gas stream with a non-aqueous liquid absorbent comprising an aliphatic primary amine and/or an aliphatic secondary amine (either or both of which can be included in a polyamine) under conditions sufficient to cause absorption of at least a portion of the $CO_2$. The absorbent may comprise the amine itself, possibly with additives to control foaming, viscosity, and other characteristics or a solution of the amine(s) in a non-aqueous, aprotic solvent, again with the possible inclusion of the additives. The liquid absorbent containing the absorbed $CO_2$ can then be treated to cause desorption of the acid gas, usually by purging with an inert (non-reactive) gas, by raising the temperature of the stream, and/or by reducing the pressure.

The method of the invention is usually operated as a continuous cyclic sorption-desorption process in which the gas stream containing the $CO_2$, possibly with other acidic gases such as $SO_2$ and/or $H_2S$, depending on the source of the gas stream, is contacted with a circulating stream of the liquid absorbent in a gas/liquid contact tower under the required sorption conditions to form a rich solution of the sorbed $CO_2$ which can then be cycled to a regeneration tower in which the conditions required for desorption of the $CO_2$ can prevail, e.g., gas sparging, reduced pressure, and/or increased temperature. Upon release of the $CO_2$ from the rich solution, the resulting regenerated lean solution can be cycled to the sorption tower and the $CO_2$ recovered as a separate product which may be used industrially and/or sequestered, e.g., by injection into a subterranean formation.

The method of this invention uses non-aqueous amine sorbents for the reversible capture of the $CO_2$ from gas mixtures. The non-aqueous amine scrubbing can be carried out with a reduced regeneration temperature requirement while giving a higher $CO_2$ sorption capacity relative to the same or comparable amine in an aqueous solution. These benefits are typically in addition to the reduced corrosivity of these non-aqueous solutions.

This non-aqueous amine scrubbing uses aliphatic primary and/or secondary amines either as such or dissolved in a non-aqueous, preferably polar, aprotic solvent for the chemical absorption of the $CO_2$, together with other acid gases present in the stream, when the $CO_2$ is either a major or minor component.

The present process using a non-aqueous solvent absorbent system can proceed differently from the commercially practiced aqueous-based adsorption processes and offers a number of advantages. In aqueous amine solutions, the amine and $CO_2$ typically react to form products including ammonium carbamate and ammonium bicarbonate/carbonate salts; it is believed that the amines and $CO_2$ tend to react initially to form carbamates which may eventually be hydrolyzed by the water to form bicarbonate, or to form carbonate, although some strong bases may react directly with the $CO_2$ to form bicarbonate without proceeding through the carbamate. The $CO_2$ to amine molar ratio (for polyamines, for example, containing tertiary amines, this $CO_2$ to amine molar ratio should more appropriately be a $CO_2$ to non-tertiary, or primary plus secondary, amine molar ratio) can be 1:1 for complete conversion to ammonium bicarbonates and 0.5:1 for conversion to ammonium carbamate and/or carbonate salts. Using primary and secondary amines in non-aqueous solvents can give $CO_2$ to amine molar ratios that can exceed the theoretical maximum of 0.5:1 for ammonium carbamate, as discussed below.

BRIEF DESCRIPTION OF THE DRAWINGS

FIG. 2.1 graphically depicts the $CO_2$ reaction with 3-amino-propionitrile (APN) at 30° C. in dimethyl sulfoxide (DMSO) at different concentrations.

FIG. 2.2 graphically depicts a vapor-liquid equilibrium plot of $CO_2$ with APN in DMSO on a molar basis at various temperatures.

FIG. 6.1 graphically depicts real time NMR monitoring of $CO_2$ reaction with monoethanolamine (MEA) in DMSO at 30° C.

FIG. 6.2 graphically depicts a vapor-liquid equilibrium plot of $CO_2$ with MEA in DMSO on a molar basis at various temperatures.

DETAILED DESCRIPTION OF THE EMBODIMENTS

The method of this disclosure involves removing $CO_2$ and/or other acid gases, such as $H_2S$, from a gas stream containing one or more of these gases using a non-aqueous amine (optionally in solution) as an absorbent. The non-aqueous amine scrubbing of this disclosure is based on the selective absorption of a gas mixture and involves contacting the gas mixture with a liquid, non-aqueous, selective sorbent under conditions sufficient to effect selective removal of $CO_2$ and/or other acid gases in the stream. In addition to being non-aqueous, the liquid sorbent system can also be free of compounds containing protic hydrogens, e.g., can be free of any significant quantity of alcohols, carboxylic acids, phenols, etc., except for any alcohol functionalities present in the chemical structure of the amine itself. The absorption conditions (i.e., temperature and/or pressure) should be favorable for absorbing a component of the gas mixture, for example, in an absorption tower, and for producing an absorption effluent which has a reduced concentration of the absorbed component relative to the gas mixture. Subsequently, the sorbed component can then be desorbed from the liquid sorbent, suitably by stripping with a non-reactive gas, e.g., a natural gas stream, in a regeneration tower under conditions favoring release of the sorbed acid gas, normally increased temperature or decreased pressure. Under the selected desorption conditions, the sorbed component can be purged from the selective absorbent and recovered.

Cyclic Sorption Unit

Figure 1:
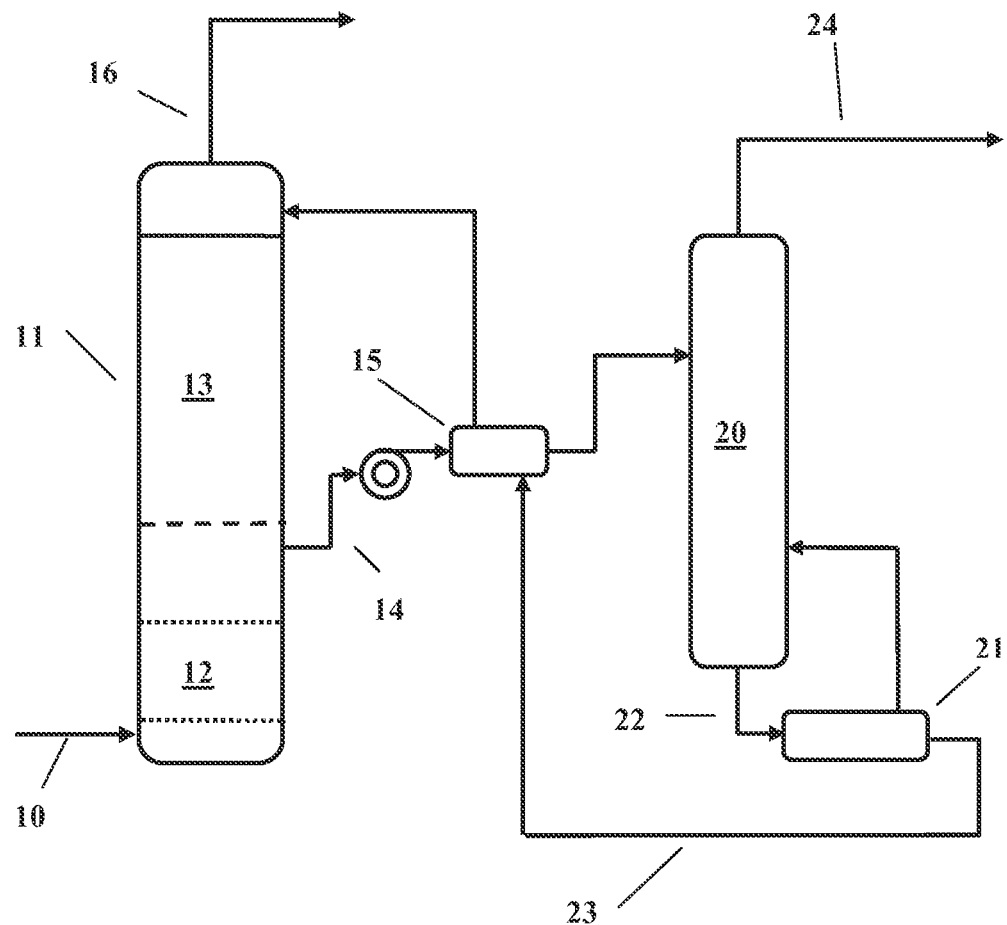
FIG. 1 is a simplified schematic of a cyclic separation unit suitable for separating $CO_2$ from a flue gas stream.

FIG. 1 shows a representative simplified schematic of a continuous cyclic gas separation unit which may be used for separating $CO_2$ from flue gas streams, natural gas streams, and other streams using the present non-aqueous solvent amine absorbent solutions. The hot flue gas stream can enter the unit by way of line 10, entering near the bottom of absorber tower 11 and preferably passing through a cooling section 12, in which its temperature can be reduced by direct or indirect cooling to bring it to a suitable temperature for the sorption step which follows. In an alternative embodiment, the cooling of the hot flue gas stream can be achieved prior to the stream entering the absorber tower 11.

From here, the gas stream can pass into sorption section 13 in countercurrent contact with a descending stream of the amine absorbent dissolved in the non-aqueous solvent. At least part of the $CO_2$, along with other gases which are amenable to absorption in the solution, can be absorbed into the non-aqueous solvent amine absorbent solutions resulting in a "rich" solution 14 containing the sorbed $CO_2$ which can be removed with a separation tray (not shown) near the lower end of the sorption section. The rich solution can then pass through heat exchanger 15 to desorption/regeneration tower 20 in which the $CO_2$ and other gases can be desorbed, in this case, by an increase in temperature, decrease in pressure, and/or the use of a purge (stripping gas). The rich solution can enter the tower at a level appropriate to its composition and can pass downwards as dissolved gases are removed. Heat for the regeneration tower can be supplied by reboiler 21 which can circulate a slipstream of solution taken from near the bottom of the regeneration tower by way of line 22. A stream of regenerated lean solution with a lower content of $CO_2$ can be taken from the reboiler in line 23 to pass through the other side of heat exchanger 15 before re-entering absorber tower 11 for passage through the gas stream. A gas stream of decreased $CO_2$ content can pass out of absorber tower 11 through line 16, and the desorbed $CO_2$ and other acid gases removed from the original gas stream can be removed in concentrated form through line 24 and taken to final sequestration or utilization (e.g., in industrial gas and/or in enhanced oil recovery processes).

Conventional equipment can be used to perform the various functions of the cyclic scrubbing process, such as monitoring and automatically regulating the flow of gases so that it can be fully automated to run continuously in an efficient manner.

Absorption Process

In the design of a practical $CO_2$ capture process, a number of issues need to be considered, including:

The efficiency of the capture process in terms of relative amount of absorbent required;

The efficiency of the capture process in terms of energy required for absorption/desorption; and Corrosion factors.

These issues are, of course, directly affected by the chemistry of the sorption/desorption processes. It is believed that the carbon atom of $CO_2$ is electron-deficient, making it susceptible to nucleophilic attack. In aqueous amine solution, the relative nucleophilicity of the amine and water can determine the reactive pathway. Nucleophilic addition can create a zwitterionic transition state, which can undergo an intramolecular proton transfer to a neutral acid. If water is the acting nucleophile, carbonic acid typically results; with an amine as the acting nucleophile, carbamic acid is generally formed. Subsequent reaction with a Bronsted base amine can lead to either an ammonium bicarbonate or an ammonium carbamate, respectively. Primary and secondary amines can exhibit both Lewis and Bronsted basicities in this scheme. Tertiary amines lack a proton for intramolecular transfer to form the acid intermediate, and therefore only exhibit Bronsted basicity in this chemistry. Further reaction of the carbamate with water may lead to a final bicarbonate product with a 1:1 $CO_2$:amine ($CO_2$:non-tertiary amine) ratio, or to a carbonate product with a 1:2 $CO_2$:amine ($CO_2$:non-tertiary amine) ratio (depending on solution pH). The conventional aqueous process is based on trying to control adsorption/desorption conditions to enhance fast carbamate formation while minimizing the formation of bicarbonates.

In non-aqueous systems, a zwitterion can form by nucleophilic attack of the lone pair of electrons on the nitrogen of the amine onto the carbon of the $CO_2$. Again, the zwitterion is usually unstable and can rapidly rearrange via proton transfer to the corresponding carbamic acid. Both the zwitterions and the carbamic acids can generally be unstable, and it is not known which equilibrium form undergoes further reaction, although it is posited that the $CO_2$ carbamic acid may be deprotonated by a second equivalent of free amine to produce an ammonium carbamate salt with the overall stoichiometric requirement of two moles of amine per one mole of carbon dioxide absorbed (0.5:1 $CO_2$:non-tertiary amine). This pathway can also be found in aqueous systems at early reaction stages, although there may be a different carbamate-carbamic acid equilibrium in non-aqueous systems, and, in the aqueous systems, there exists the possibility of further reaction with water to form bicarbonate and carbonate.

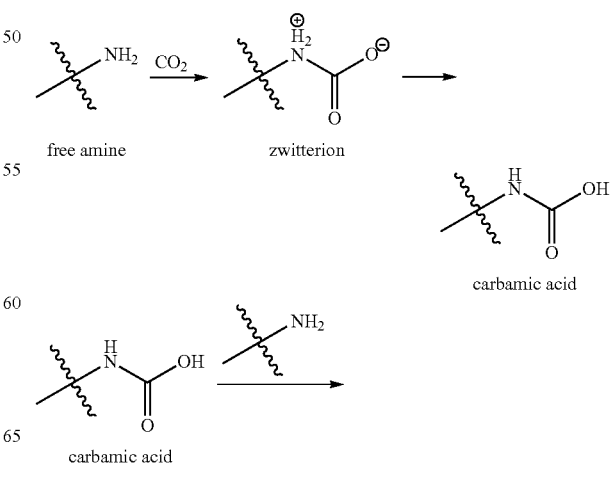

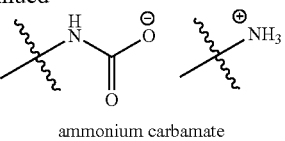

ammonium carbamate

While primary and secondary amines can form the carbamic acid/carbamate species in both aqueous and non-aqueous systems, tertiary amines are typically unable to do so in non-aqueous systems, lacking the necessary proton for the transformation of the zwitterion to the carbamic acid. Also, it has been discovered herein that the carbamates formed from secondary amines can generally be less stable than those formed from primary amines.

It is believed that, if the amine is a sufficiently strong Lewis base, it may attack $CO_2$ directly to form the zwitterion intermediate described above, which can rapidly decompose via internal proton transfer to the carbamic acid. Carbamic acids are generally Bronsted acids that can typically react with a second mole of amine to form an ammonium carbamate. It appears that, in a non-aqueous system, it can be possible for the amine-$CO_2$ reaction to be dominated by Lewis acid-base chemistry (the transfer of electron pairs from a base to an acid), rather than Bronsted acid-base chemistry (proton transfer from an acid to a base). In this case, the reaction can proceed to form a carbamic acid product of sufficient stability that it can undergo only a limited degree of subsequent Bronsted reactivity to form an ammonium carbamate. This can result in an unexpected and beneficial increase in the amount of absorbed $CO_2$, in excess of the theoretical maximum predicted from complete ammonium carbamate formation. In any event, regardless of the exact nature of the reaction mechanism, we have found that, by using a non-aqueous absorbent, it is possible to absorb $CO_2$ at a ratio exceeding the 0.5:1 $CO_2$:(non-tertiary) amine ratio characteristic of carbamate formation.

By operating in a non-aqueous system, it appears that the intermediate carbamic acid species may be stabilized relative to the ammonium carbamate species. By using this finding in an acid gas removal process, the benefit of an increased molar loading capacity of the sorbent amine above the theoretical maximum of 0.5:1 for ammonium carbamate formation has been achieved. $CO_2$:(non-tertiary) amine ratios approaching the theoretical carbamic acid ratio of 1:1 can be potentially achievable, and ratios reaching as high as 0.85:1 and 0.91:1 per (non-tertiary) amine group have been demonstrated. In combination with the significantly reduced corrosivity and a reduced amine regeneration energy afforded by the use of non-aqueous solvents, the present separation process can provide substantial operational and economic benefits in comparison with conventional amine scrubbing technology.

Without being held to the hypothesis, it is believed that the mechanism for increased $CO_2$ capacity, in excess of the theoretical maximum, can proceed through the formation of zwitterion and/or carbamic acid pairs, as well as through the isolated carbamic acids; it is possible that the pairs can in some manner be stabilized in a non-aqueous system, especially in non-aqueous systems using the preferred polar, aprotic solvents. Examples of these pairs could be as follows, with the zwitterionic (left) and carbamic acid (right) hydrogen-bonded pairs:

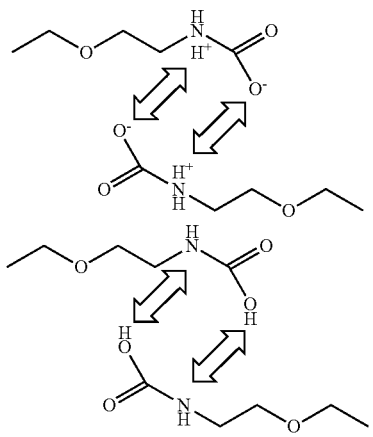

The use of polyamines in the present non-aqueous separation processes can advantageously result in unexpected benefits, as disclosed below.

Gas Stream

The gas streams particularly amenable to treatment by the present sorption process can include flue gas from the combustion of carbonaceous fuels and/or natural gas from subterranean and other sources. Flue gas may originate from the combustion of carbon-containing fossil fuels such as natural gas, oils, and/or lignite, as well as sub-bituminous, bituminous, and/or anthracite coals. Its $CO_2$ content may typically vary from about 6 to about 15 weight percent, depending on the fuel, with the highest levels coming from hard coal combustion and the lowest from natural gas. Natural gas streams containing carbon dioxide may contain, in addition to methane and carbon dioxide, one or more other gases such as ethane, n-butane, i-butane, hydrogen, carbon monoxide, ethene, ethyne, propene, nitrogen, oxygen, helium, neon, argon, krypton, hydrogen sulfide, and carbonyl sulfide, as well as, in some cases, mercury and/or other metal contaminants, if they have not been removed by other pre-treatment. Other streams that can be treated by the present separation process can include syngas and shifted syngas produced in fuel gasification processes and gas streams from petrochemical plants whose composition can naturally depend on the process from which they are derived.

The amount of carbon dioxide in the gas mixture can typically vary from about at least 1 percent upwards; in many streams, it can be at least 10 percent and may even be higher, as with some gas streams from natural gas fields such as the LaBarge (Wyoming) field, where the gas is about 66.5 percent carbon dioxide, about 20.5 percent methane, about 7.4 percent nitrogen, about 5.0 percent hydrogen sulfide, and about 0.6 percent helium.

The gas stream may optionally also be subjected to dehumidification prior to contacting with the absorbent materials and processes described herein. The dehumidification can be carried out by conventional methods by the use of a drying agent/absorber guard bed upstream of the acid gas scrubbing unit, and/or by carrying out the $CO_2$ absorption at temperatures above 100° C. using an absorbent capable of being regenerated above the absorption temperature. For example, the dehumidification can be carried out by absorption over solid sorbents such as salt dryers, molecular sieves, silica gels, and/or aluminas.

Amine Sorbents

Amines that may be used in the present sorption processes herein can include nucleophilic aliphatic primary or secondary amines, since they are able to participate in the initial formation of the zwitterion by nucleophilic attack onto the carbon of the $CO_2$ and its supposed subsequent transformation into the carbamic acid. Preferred amines can be those which have a $pK_a$ (acid dissociation equilibrium constant) of not more than about 10.5 (as measured/predicted at 25° C. in aqueous solution and/or as measured in other solvent and converted to an aqueous value, referred to as aqueous equivalent scale) with most of the useful amines having a $pK_a$ in the range of 5 to 10, in many cases from 5 to 8 or 5 to 9. Secondary amines, especially those in the preferred $pK_a$ range, may be used. Monoamines, diamines, and polyamines may be used, although, as noted below, diamines and polyamines may require the use of additional solvent to obviate the formation of high viscosity products in the presence of the $CO_2$. Substituted and unsubstituted alkyl amines may be used with substituent groups such as alkyl (usually lower $C_1$-$C_6$ alkyl), hydroxyalkyl (usually lower $C_1$-$C_6$ hydroxyalkyl), hydroxyl, alkoxy (usually lower $C_1$-$C_6$ alkoxy), aryl, and nitrile, being the most common. Aryl substituents are preferably not present but, if present at all, should typically be positioned no closer than the beta carbon of the alkyl chain in order to maintain the aliphatic character of the amine by precluding delocalization of the lone pair on the amine nitrogen into the aromatic ring system. On the other hand, the presence of polar and/or electronegative substituents, such as nitrile, hydroxyl, etc., and/or of electronegative atoms and groups, especially oxygen, in the backbone chain of the amine, as in the etheramines, is believed to be favorable for interaction with the solvent, e.g., so as to avoid the formation of precipitates in otherwise soluble systems. Oxygen and other linking species may be in the chain, such as in 2-ethoxyethylamine (2EEA or EEA).

Amines finding use as $CO_2$ sorbents herein can include the alkanolamines, such as monoethanolamine (MEA), diethanolamine (DEA), 2-amino-2-methyl-1-propanol (AMP), and 2-(2-aminoethylamino)ethanol (AEE), as well as 1,5-diamino-3-oxapentane (DAOP), 1,5-bis(methylamino)-3-oxapentane (BMAP), 2-amino-2-hydroxymethyl-1,3-propanediol (Tris), and/or diisopropanolamine (DIPA). Other amines potentially useful in the present process can include, for example, diglycolamine (DGA), 2-n-propoxyethylamine, bis(2-methoxyethyl)amine, bis(2-ethoxyethyl)amine, 3-aminopropionitrile, 3,3'-iminodipropionitrile, aminoacetonitrile, and hydroxyethylenediamine (HEDA). Tertiary amines such as triethanolamine (TEA) and N-methyldiethanolamine (MDEA) are typically not used in view of their inability to form the carbamic acid in the absence of water.

Additionally or alternately, polymeric (oligomeric) amines can be used as $CO_2$ sorbents herein, including polyalkyleneimines that are linear, cyclic, and/or branched, and that contain one or more secondary amines, optionally one or more primary amines, and optionally one or more tertiary amines. Non-limiting examples of such polyalkyleneimines can have a general repeat unit structure of —$[(CH_2)_x$—$NR]_y$—, where x is from 2 to 6, where y is from 4 to 50, and where each R is hydrogen (representing the situation where the backbone nitrogen is a secondary amine), an alkyleneamine branch having the structure —$(CH_2)$—$NH_2$ (representing the situation where the backbone nitrogen is a tertiary amine and where the resulting branch nitrogen is a primary amine), or an alkyleneimine branch having the structure —$(CH_2)_x$—$NR'_2$, where a first R' is an alkyleneamine branch or another alkyleneimine branch and a second R' is hydrogen (representing the situation where the backbone nitrogen is a tertiary amine and where the resulting branch nitrogen is a secondary amine), another alkyleneimine branch (representing the situation where the backbone nitrogen is a tertiary amine and where the resulting branch nitrogen is a tertiary amine, with the further branch nitrogen being a secondary or tertiary amine), or yet another alkyleneamine branch (also representing the situation where the backbone nitrogen is a tertiary amine and where the resulting branch nitrogen is a tertiary amine, with the further branch nitrogen being a primary amine). It should be understood herein that the subscript "y" represents the average number of repeat units in a linear polyalkyleneimine chain and thus is only meaningful as an average number; it is contemplated that the distribution of polymeric/oligomeric polyalkyleneimines can reflect some proportion of chains having higher or lower backbone/linear repeat units without significantly departing from the scope of the recited "y" range(s) herein. Polyalkyleneimine polymers/oligomers useful according to the invention can be purchased and/or prepared by conventional methods known in the art.

Figure 9:
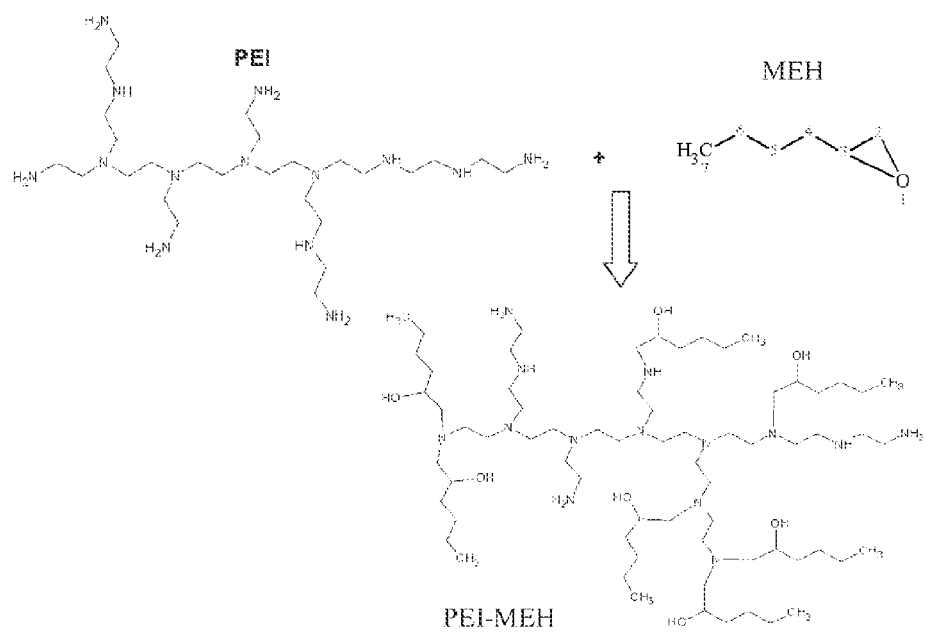
FIG. 9 depicts a reaction scheme for the reaction of a representative polyethyleneimine with an aliphatic monoepoxide (i.e., 1,2-monoepoxyhexane, or MEH) to form a partially epoxylated polymer structure containing various types of amines and singly or doubly hydroxyl-functionalized amines.

Alternately, the polyalkyleneimines can be optionally treated under conditions sufficient to eliminate or reduce the number of primary amines (preferably without significant crosslinking), e.g., via reaction such as with a monoepoxide such as illustrated for a polyethyleneimine treated with 1,2-monoepoxyhexane (MEH) in FIG. 9, which can advantageously remove or reduce the likelihood that such primary amines could contribute to forming ammonium carbamates. Different monoepoxides can show different selectivities towards reaction with primary versus secondary amines to create different contents of potentially chemisorptive (and even physisorptive) species in the polyalkyleneimine. In such alternate embodiments, the monoepoxide can include, but are not limited to, terminal (1,2-) aliphatic epoxides, internal aliphatic epoxides, cyclic or multicyclic aliphatic epoxides, aromatic epoxides, aliphatic alkyleneoxides (e.g., having from 2 to 12 carbons, from 4 to 12 carbons, from 4 to 10 carbon atoms, or from 4 to 8 carbon atoms), or the like, substituted/functionalized or without substituents, or combinations thereof. Non-limiting examples of such monoepoxides can be purchased and/or prepared by conventional methods known in the art and can include, for example, ethylene oxide, propylene oxide, 1,2-epoxybutane, 2,3-epoxybutane, 1,2-epoxyhexane, 1,2-epoxyoctene, 1,2-epoxydecane, 1,2-epoxydodecane, 1,2-epoxy-2-methylbutane, styrene oxide, cyclohexene oxide, and combinations thereof. In certain of these embodiments, the monoepoxide may contain only C, H, and O atoms and can lack other heteroatoms such as halides, phosphorus, silicon, or nitrogen. Additionally or alternately in these embodiment, the monoepoxide may contain only C, H, and O atoms and may contain only one O atom (that of the epoxide functionality). Further in such alternate embodiments, the optional treatment can yield a reaction product that is a polyalkyleneimine where some or all of the primary amines are converted to secondary and/or tertiary amines, which reaction product contains, by virtue of the epoxide reaction, one or more secondary hydroxyl groups. Still further in such alternate embodiments, treatment conditions, such as temperature, pressure and contact time, may vary greatly. Any suitable combination of such conditions may be employed herein that are sufficient to produce the desired polyalkyleneimines described herein; typically, the treatment can be carried out by combining the reactants in any order under ambient pressure with contact time varying from seconds to a few hours or greater. In various embodiments, the treated polyalkyleneimine can contain primary amines that have been doubly reacted with the monoepoxide to produce tertiary amines bearing two secondary hydroxyl moieties. Though a goal of treatment can be to eliminate primary amines from the polyalkyleneimine, the treated polyalkyleneimines can still contain some residual (reduced number of) unreacted primary amines. Additionally or alternately, the treated polyalkyleneimine can contain some primary amines that have reacted to form secondary and/or tertiary amines, but substantially no secondary amines in the treated polyalkyleneimine can be observed to have formed tertiary amines. Further additionally or alternately, the treated polyalkyleneimine can contain some primary amines that have reacted to form secondary amines, but substantially no primary amines that have further reacted to form tertiary amines.

The polyalkyleneimines useful in the methods according to the invention can exhibit only secondary amines (only unbranched cyclic, typically not subjected to the optional treatment), only primary and secondary amines (e.g., typically unbranched, linear or cyclic; typically not subjected to the optional treatment), only secondary and tertiary amines (e.g., typically but not necessarily subjected to the optional treatment), only primary and tertiary amines (highly uncommon and typically not subjected to the optional treatment), or primary and secondary and tertiary amines (which may or may not have been subjected to the optional treatment). In such cases where only primary and secondary amines are present, the average molar ratio of primary amines to secondary amines can range from about 2:1 to about 1:40, for example from about 2:1 to about 1:20, from about 2:1 to about 1:15, from about 1:1 to about 1:40, from about 1:1 to about 1:20, from about 1:1 to about 1:15, or from about 1:1 to about 1:10. In such cases where only secondary and tertiary amines are present, the average molar ratio of secondary amines to tertiary amines can range from about 15:1 to about 1:3, for example from about 10:1 to about 1:2 or from about 6:1 to about 1:1. In such cases where primary, secondary, and tertiary amines are all present, at least one or more of the following can advantageously apply: the average molar ratio of primary amines to secondary amines can range from about 5:1 to about 1:50, for example from about 5:1 to about 1:30, from about 5:1 to about 1:15, from about 3:1 to about 1:30, from about 3:1 to about 1:15, or from about 3:1 to about 1:10; the average molar ratio of secondary amines to tertiary amines can range from about 15:1 to about 1:10, for example from about 10:1 to about 1:5; and the average molar ratio of primary amines to tertiary amines can range from about 10:1 to about 1:50, for example from about 10:1 to about 1:30, from about 10:1 to about 1:20, from about 10:1 to about 1:10, from about 5:1 to about 1:10, from about 5:1 to about 1:30, from about 5:1 to about 1:20, or from about 5:1 to about 1:10.

Although only the polyalkyleneimines have been disclosed hereinabove to be optionally treated, e.g., with a monoepoxide, it should be understood that the primary and/or secondary amine sorbent materials can optionally have been similarly treated, so long as not all amine groups become tertiary amines, i.e., such that some primary and/or secondary amine groups in the sorbent materials remain.

One significant favorable aspect of the present non-aqueous solvent based process includes that amines can achieve separation comparable to aqueous separation systems utilizing hydroxyamines/alkanolamines such as MEA. Product stoichiometry, loading, and/or absorption/desorption kinetics may be further manipulated advantageously by varying the structure of the amines used (e.g., by attaching electron-withdrawing or donating groups) to provide different inherent basicities ($pK_b$'s) and/or steric properties. A useful means of making an adequate prediction of the $pK_a$ value of the amine can be the ACD/PhysChem Suite™ (a suite of software tools for the prediction of basic physicochemical properties including $pK_a$), available from Advanced Chemistry Development, Inc., 110 Yonge Street, Toronto, Ontario, Canada M5C 1T4.

Non-Aqueous Solvent

The amine may be used as the neat liquid sorbent material provided that it remains sufficiently liquid to be pumped and handled in the unit. In certain embodiments, for this reason diamines and higher amines for the most part tend not to be preferred without a solvent, since gels and other viscous reaction products may be formed with the $CO_2$ due to the di-/poly-functionality of molecules and/or the potential for strong intermolecular interactions. In any event, it has been found that the solvent may enhance the capability of the sorbent to react with the $CO_2$ at desirable $CO_2$:amine adsorption ratios.

The solvent used in the present process is a non-aqueous, aprotic solvent with more polar solvents being generally preferred over less polar solvents. Polar solvents for the amine sorbent may be capable of solvating the hypothetical zwitterion and carbamic acid pairs better, as compared to solvents of lower polarity, and so can mitigate the tendency of the ion pairs to form dimers in solution. A polar solvent can additionally or alternately increase physical absorption of the $CO_2$, which can increase the concentration of $CO_2$ in solution, thereby facilitating increased loading and capacity of the absorbent. A significant advantage of the non-aqueous solvent processes herein can include a reduction in corrosivity of the acid gas solutions as compared to the aqueous-based systems, thereby enabling more extensive use of cheaper metallurgies, e.g., carbon steel, in associated equipment with reduced concern about corrosion at higher $CO_2$ loadings.

A solvent such as toluene with a relatively low dipole moment has been found to be effective, although, in general, higher values for the dipole moment (Debye) of at least 1.7, for example of at least 2, and preferably of at least 3, have been shown to have the greatest effect as with preferred solvents such as DMSO (dimethylsulfoxide), DMF (N,N-dimethylformamide), NMP (N-methyl-2-pyrrolidone), HMPA (hexamethylphosphoramide), THF (tetrahydrofuran), sulfolane (tetramethylene sulfone), and the like. Preferred non-aqueous solvents (in terms of achieving $CO_2$ loadings of 0.5 or more, based on $CO_2$:amine ratio) can have C=O and/or S=O groups on them with which the carbamic acid reaction product may be capable of stabilization by hydrogen bonding with the oxygen of these (or similar) groups. In addition to having a polar nature, the selected solvent should typically also be aprotic; for this reason, the use of protic compounds as the solvent, such as alcohols, carboxylic acids, phenols and water, are generally disfavored. Again, this does not preclude the use of amine solvents containing hydroxyl groups to maintain the solubility of the sorbent and its complexes/reaction products, such as in the case of polyalkyleneimine polymers/oligomers treated with epoxide in order to yield a reaction product containing secondary hydroxyl groups.

In addition to preferred solvents being non-aqueous, polar, and aprotic, they can preferably also have a boiling point of at least 65° C. (for example 70° C. or higher), in order to reduce solvent losses in the process, and higher boiling points tend to be more desirable, of course depending on the regeneration conditions which are to be used. If the regeneration is to be carried out at a temperature above 100° C., e.g., if so required for the desorption and/or to remove any water that may enter the system, a boiling point above 100° C., sometimes above 150° C. or even higher, may be preferable. Use of higher boiling point solvents can conserve valuable energy that could otherwise be consumed in vaporization of the solvent.

Solvents found effective to various extents can include toluene, sulfolane (tetramethylene sulfone), and dimethylsulfoxide (DMSO). Although toluene has a low dipole moment, indicating a low degree of polarity, it is adequately polar for use in the present process as shown by experiment. Other solvents of suitable boiling point and dipole moment could include, but are not limited to, acetonitrile, dimethylformamide (DMF), tetrahydrofuran (THF), ketones such as methyl ethyl ketone (MEK), esters such as ethyl acetate and amyl acetate, halocarbons such as 1,2-dichlororobenzene (ODCB), and combinations thereof. Dipole moments (D) and boiling points for selected solvents are:

|  | Dipole Moment (D) | Boiling Point (° C.) |
| --- | --- | --- |
| Toluene | 0.36 | 110.6 |
| Sulfolane | 4.35 | 285 |
| DMSO | 3.96 | 189 |
| DMF | 3.82 | 153 |
| MEK | 2.78 | 80 |
| Acetonitrile | 3.92 | 81 |
| THF | 1.63 | 66 |
| ODCB | 2.50 | 180.5 |

Once the absorbent has been formulated, optionally with ingredients such as antioxidants, corrosion inhibitors, antifoaming agents, and the like, it can be employed, for example, in an absorption unit, such as illustrated in FIG. 1.

Figure 4:
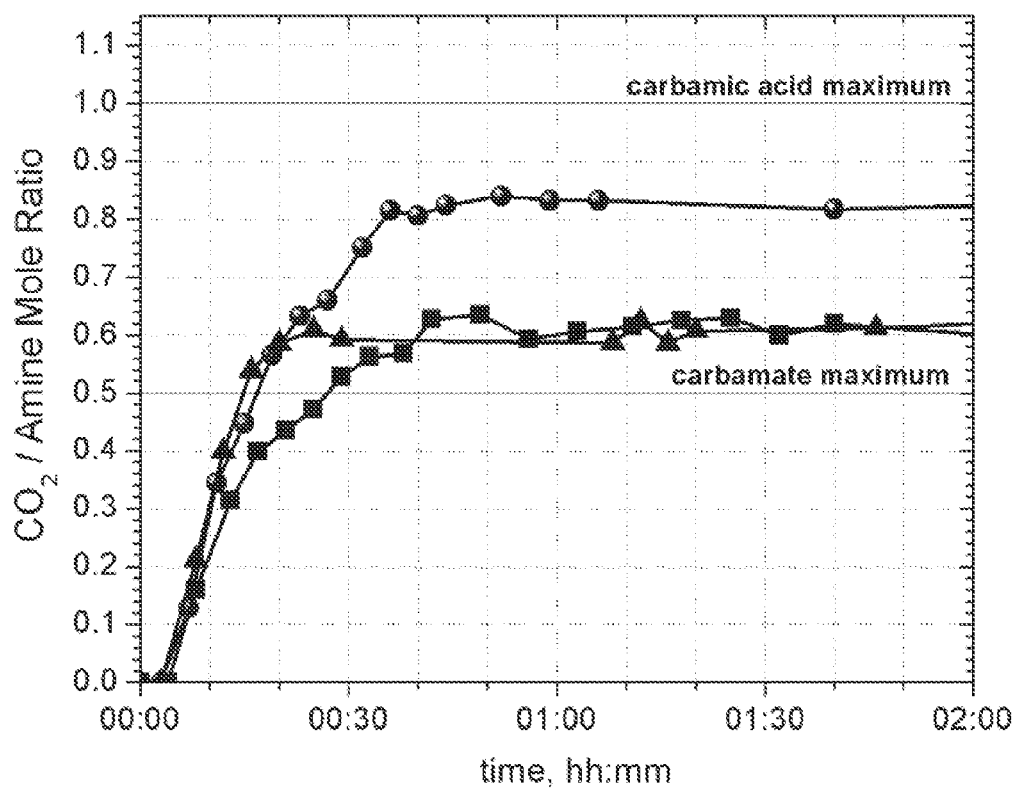
FIG. 4 graphically depicts real time NMR monitoring of $CO_2$ reaction with 2-ethoxyethylamine (2EEA) in dimethyl sulfoxide (DMSO), sulfolane and toluene.

The concentration of the primary amine and/or secondary amine, and/or the concentration/distribution of primary, secondary, and/or tertiary amines in the case of polyamines, in the non-aqueous solvent can vary over a wide range. As shown in FIGS. 2 and 4, the amine:solvent ratio (concentration) can typically have a significant effect on the nature of the amine-$CO_2$ product formed, with the preferred carbamic acid product dominating at low amine concentrations, and with the less preferred ammonium carbamate product dominating at higher amine concentrations. Nonetheless, at all experimental amine concentrations, e.g., ranging from 10 weight percent to 90 weight percent, the beneficial use of the non-aqueous solvent can be observed as a $CO_2$:(non-tertiary) amine ratio of greater than 0.5:1 is achieved. The amine concentration may be optimized for specific amine/solvent mixtures in order to achieve the maximum (or at least a desirably high) total absorbed $CO_2$ concentration, which typically can be achieved at the highest amine concentration, although a number of counter-balancing factors can force the optimum to lower amine concentrations. Among these can include limitations imposed by solution viscosity, amine and/or amine-$CO_2$ product solubilities, and solution corrosivity, inter alia. In addition, as the amine concentration can affect the nature of the amine-$CO_2$ product formed, and as the carbamic acid and ammonium carbamate products can have different thermal stabilities, the amine concentration can also directly affect the required regeneration energy for a specific amine/solvent mixture. Therefore, the (optimal) amine concentration can be selected to balance the maximum total absorbed $CO_2$ concentration and the (lowest) required regeneration energy, contingent upon the viscosity, solubility, and corrosivity limitations described above.

As shown in FIGS. 2 and 4, this concentration can likely vary for individual amine/solvent combinations and can therefore be selected on an empirical basis that optionally but preferably also factors in the $CO_2$ feed rate relative to the rate of sorbent circulation in the unit. If the solvent, for example a C=O and/or S=O group-containing solvent such as DMSO, is a better stabilizer for the 1:1 carbamic acid and zwitterion $CO_2$ sorption products than the neat amine, lower concentrations of amines in these good solvents would tend to favor higher sorption/capacity. There can exist, therefore, a balance between the respective equilibria; at lower amine concentrations, the sorption reaction products can be favored by better stabilization, and, at higher amine concentrations, more amine can be present, which may push the equilibrium towards product. The temperature and pKa of the amine can also play into this equilibrium. In general, primary and/or secondary amine absorbents can be used in a concentration of the amine(s) typically ranging from about 5 or about 10 weight percent to about 90 weight percent (of the total solution), for example from about 10 weight percent to about 50 weight percent, or even lower, such as from about 10 to about 30 weight percent.

The formation of precipitates in solution-based sorption units can be regarded as generally undesirable, since, if precipitates are formed, the concentration of the active amine sorbent can decrease in solution, and thus the amount of soluble amine available for $CO_2$ capture can decrease accordingly. For this reason, the use of amines with electronegative/polar substituents can potentially be favorable.

FIG. 2 depicts a reaction between a representative polyethyleneimine (PEI) having a molecular weight of about 600 and an aliphatic monoepoxide (1,2-monoepoxyhexane, or MEH). The starting representative PEI represented in FIG. 2 has a primary amine:secondary amine:tertiary amine ratio of about 3:2:2. After reaction with the MEH, the primary amine:secondary amine:tertiary amine ratio became about 3:3:8. When exposed to $CO_2$ at approximately room temperature, the $CO_2$ uptake ratio can be as high as about 1:1 $CO_2$:primary amine and secondary amine. The solubility of the $CO_2$-loaded PEI:MEH is a desired property. In $d_6$-DMSO at a ~10 wt % loading of PEI:MEH, the compound can be highly (completely) soluble when fully reacted with $CO_2$, whereas the unmodified PEI alone can form a solid when loaded with $CO_2$ at a concentration of ~10 wt % in chloroform.

In certain embodiments, the solubility of the polymeric/oligomeric polyalkyleneimines and their $CO_2$ sorption complexes in various non-aqueous solvents can be fine tuned for the particular removal process. The ability to fine tune the solubility of the modified polyalkyleneimine materials and their $CO_2$ reaction products, e.g., by modifying hydrophobicity/hydrophilicity such as through changing the aliphatic monoepoxide hydrocarbon chain length can provide a handle to fine tune products and maximize loadings (and/or favorable absorption/desorption kinetics) through the exploitation of solvent effects. Maintaining solubility of the modified polyalkyleneimine:$CO_2$ reaction product in the non-aqueous solvent after sorption can be a desired property, e.g., for easy desorption, pumpability, and/or cyclability during the removal process. Gelation, precipitation, or other heterogeneities of the sorption product solution are thus typically undesirable in these systems.

Absorption (or "Sorption")

The separation/sorption step/process herein can involve removing $CO_2$ and/or other acid gases, such as $H_2S$, from a gaseous stream containing one or more of these gases using a non-aqueous amine as an absorbent. The absorbent compositions are described herein. The non-aqueous amine sorption/scrubbing of this disclosure is based on the selective absorption/removal of $CO_2$ and/or other acid gases from a gas mixture and involves contacting the gas mixture with a selective absorbent under conditions sufficient to effect selective removal. The absorption conditions (e.g., temperature and/or pressure) should be favorable for selectively absorbing a component (e.g., $CO_2$) of the gas mixture, for example, in an absorption tower, and producing an absorption effluent, which has reduced concentration of the absorbed component relative to the gas mixture. Subsequently, the absorbable component can then be desorbed, e.g., by stripping with an inert gas, a natural gas stream, and/or steam, for example, in a regeneration tower. Under desorption conditions, the absorbable component can be purged from the selective absorbent.

Once the absorbent has been formulated, it can be employed, for example, in an absorption tower in the selective acid gas removal process. The absorbent can be purchased and/or made by conventional processes, e.g., mixing. After the absorbent is manufactured, it can be used, for example, in an absorption tower, where a gaseous stream containing $CO_2$ contacts the absorbent, e.g., in a counter-current manner. The $CO_2$ and amine can chemically react to form a complex (e.g., a carbamic acid and/or a carbamate), thereby reversibly removing the $CO_2$ from the gaseous stream (e.g., by chemisorption).

After the absorbent is loaded with $CO_2$ to a satisfactory level, for example, when the $CO_2$ absorption has reached about 80% of saturation or more, or at a designated cycle time, the sorbent can be regenerated. Regeneration generally involves desorbing the absorbed $CO_2$ typically by stripping with an inert gas, a natural gas stream, and/or steam, for example, in a regeneration tower. During this step, the amine complex can be dissociated, thus effectively trapping/removing $CO_2$, and freeing (regenerating) the amine for re-use.

Figure 5:
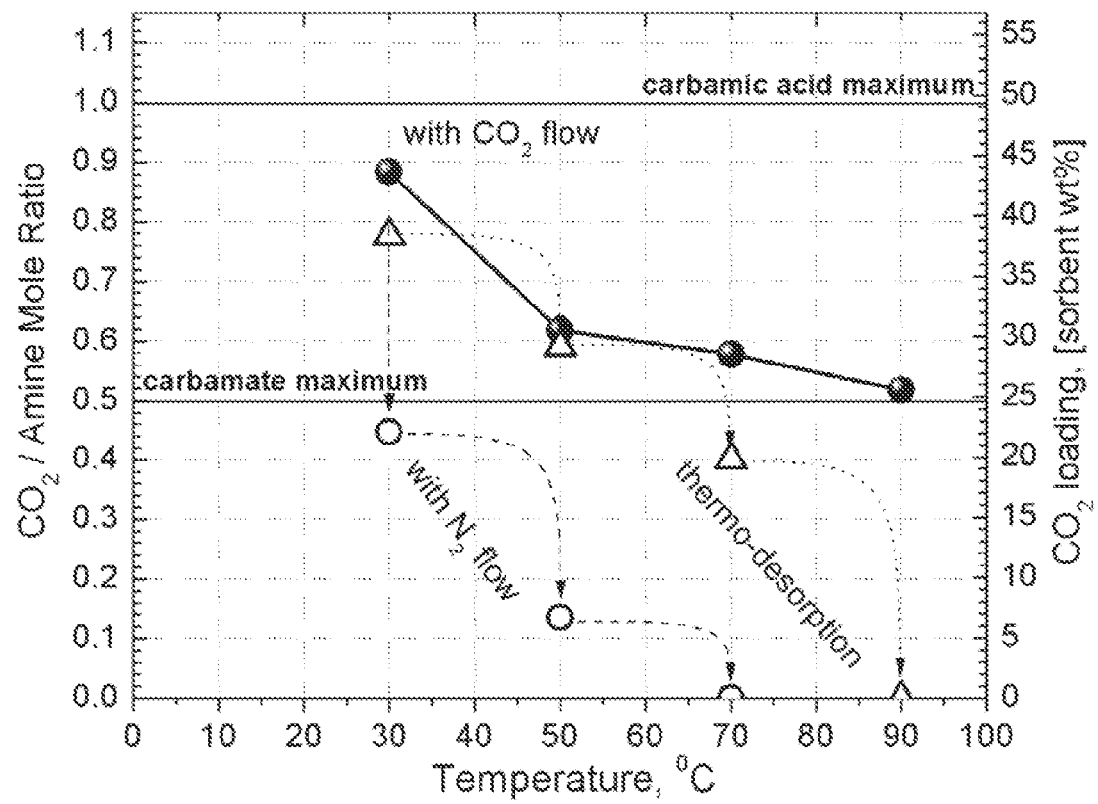
FIG. 5 graphically depicts the $CO_2$ uptake and regeneration curves (purge, thermal) for 15 weight percent 2EEA in DMSO.

For absorption, the temperature can typically be in the range from about 20° C. to about 90° C., for example from about 25° C. to about 75° C. Although the decrease in stability of the $CO_2$/amine species can generally appear monotonic with increasing temperature (see FIGS. 5 and 7), it may be possible to hold the $CO_2$:(non-tertiary) amine ratio at a value above the desired 0.5:1 minimum at temperatures up to 90° C. with selected amine/solvent combinations, as shown by FIG. 5. In most cases, however, a maximum temperature for the sorption can be 75° C., and, if operation is feasible at a lower temperature, e.g., with a chilled incoming natural gas stream, resort may be advantageously made to lower temperatures at this point in the cycle. Temperatures below 50° C. are likely to be favored for near optimal sorption, in certain cases.

The adsorption pressure can preferably be in the range from about 0.1 barg (about 10 kPag) to about 20 barg (about 2 MPag), preferably from about 0.1 barg (about 10 kPag) to about 10 barg (about 1 MPag). The partial pressure of carbon dioxide in the gas mixture can vary according to the gas composition and/or the pressure of operation, but can typically be from about 0.1 barg (about 10 kPag) to about 20 barg (about 2 MPag), preferably from about 0.1 barg (about 10 kPag) to about 10 bar (about 1 MPag). The gas mixture can be contacted countercurrently or co-currently with the absorbent material at a gas hourly space velocity (GHSV) from about 50 (S.T.P.)/hour to about 50,000 (S.T.P.)/hour.

The amine/solvent sorbent system is not necessarily limited to removal of $CO_2$ but, in view of the basic nature of the amines, can be capable of removing other acid gases such as those typically found in flue gas and/or wellhead natural gas.

The gas mixture containing carbon dioxide can originate from natural and/or artificial sources. The gas mixture can contain, in addition to carbon dioxide, one or more other gases, such as methane, ethane, n-butane, i-butane, hydrogen, carbon monoxide, ethene, ethyne, propene, nitrogen, oxygen, helium, neon, argon, krypton, hydrogen sulfide, and the like.

The constituents of the gas mixture may have different proportions. The amount of carbon dioxide in the gas mixture can typically be at least 1 percent by volume, for example at least 10 percent by volume or 50 percent by volume or greater. The gas mixture can include or be any of a variety of gases, for example, natural gas, flue gas, fuel gas, waste gas, air, or the like, or combinations thereof.

The gas mixture can optionally be subject to dehumidification prior to contacting with the absorbent material, particularly if aqueous chemistry is sought to be avoided in non-aqueous systems. The dehumidification can be carried out by conventional methods, e.g., by absorption over solid sorbents such as molecular sieves, zeolites, silica gels, aluminas, or the like, or mixtures and/or reaction products thereof.

In particular, water can be excluded from entering the system through the use of a drying agent/absorber guard bed upstream of the acid gas scrubbing unit, or by carrying out the $CO_2$ absorption at temperatures above the boiling point of water (~100° C.) using an absorbent capable of being regenerated above the absorption temperature. Additionally or alternately, the amine sorbent can be substantially soluble in the non-aqueous solvent, while water can be relatively insoluble in the solvent-amine mixture/solution, in order to facilitate phase separation of any water entering/entrained with the input gas being scrubbed.

As illustrated in the Examples herein, the non-aqueous solvent amine processes herein can preferably achieve an Adsorption Efficiency ($CO_2$/non-tertiary amine adsorption mole ratio) of at least 0.5:1, for example at least 0.7:1 or at least 0.85:1.

In situations where polymeric amines are used, both the polymeric amine composition and the $CO_2$-sorbed polymeric amine complex can be inventive. Particularly where the polymeric amine composition includes a polyalkyleneimine treated to reduce or eliminate primary amine content, a novel polymeric amine composition can include the reaction product of a monoepoxide and a polyalkyleneimine oligomer in a non-aqueous aprotic solvent, wherein: the monoepoxide is an aliphatic alkyleneoxide having from 4 to 12 carbon atoms (e.g., from 4 to 10 carbons atoms or from 4 to 8 carbon atoms); the polyalkyleneimine oligomer is linear, cyclic, and/or branched and has the following repeat unit structure: —[$(CH_2)_x$—NR]$_y$—, where x is from 2 to 6 (e.g., is from 2 to 4, is from 2 to 3, or is 2), where y is from 4 to 50 (e.g., from 4 to 35, from 4 to 25, from 4 to 20, from 4 to 15, from 4 to 12, from 4 to 10, from 6 to 50, from 6 to 35, from 6 to 25, from 6 to 60, from 6 to 15, from 6 to 12, or from 6 to 10), and where R is hydrogen, an alkyleneamine branch having the structure —$(CH_2)_x$—$NH_2$, or an alkyleneimine branch having the structure —$(CH_2)_x$—$NR'_2$, wherein a first R' is either an alkyleneamine branch or another alkyleneimine branch and a second R' is hydrogen, another alkyleneamine branch, or yet another alkyleneimine branch; the reaction product comprises one or more secondary amines and one or more tertiary amines, as well as one or more hydroxyl groups (e.g., such as secondary hydroxyl groups from the monoepoxide treatment); the non-aqueous aprotic solvent is polar and has a dipole moment (D) of at least 1.7 (e.g., of at least 2, of at least 2.5, of at least 3, from 1.7 to 5, from 1.7 to 4.5, from 1.7 to 4, from 2 to 5, from 2 to 4.5, from 2 to 4, from 2.5 to 5, from 2.5 to 4.5, from 2.5 to 4, from 3 to 5, from 3 to 4.5, or from 3 to 4); and the polymeric amine composition has a viscosity at about 25° C. of about 10 cPs or less (e.g., about 7 cPs or less, about 5 cPs or less, about 4 cPs or less, or about 3 cPs or less) and a $CO_2$ adsorption efficiency of at least 0.5:1 moles $CO_2$/moles of primary plus secondary (non-tertiary) amine (e.g., at least 0.7:1 or at least 0.85:1). Furthermore, particularly where the $CO_2$-sorbed polymeric amine complex includes a complex of $CO_2$ with a polymeric amine composition containing a polyalkyleneimine treated under conditions sufficient to reduce or eliminate primary amine content, a novel $CO_2$-sorbed polymeric amine complex can include the reversible chemisorption complex of $CO_2$ with the reaction product of a monoepoxide and a polyalkyleneimine oligomer in a non-aqueous aprotic solvent, wherein: the monoepoxide is an aliphatic alkyleneoxide having from 4 to 12 carbon atoms (e.g., from 4 to 10 carbons atoms or from 4 to 8 carbon atoms); the polyalkyleneimine oligomer is linear, cyclic, and/or branched and has the following repeat unit structure: —[$(CH_2)_x$—NR]$_y$—, where x is from 2 to 6 (e.g., is from 2 to 4, is from 2 to 3, or is 2), where y is from 4 to 50 (e.g., from 4 to 35, from 4 to 25, from 4 to 20, from 4 to 15, from 4 to 12, from 4 to 10, from 6 to 50, from 6 to 35, from 6 to 25, from 6 to 60, from 6 to 15, from 6 to 12, or from 6 to 10), and where R is hydrogen, an alkyleneamine branch having the structure —$(CH_2)_x$—$NH_2$, or an alkyleneimine branch having the structure —$(CH_2)_x$—NR'$_2$, wherein a first R' is either an alkyleneamine branch or another alkyleneimine branch and a second R' is hydrogen, another alkyleneamine branch, or yet another alkyleneimine branch; the reaction product comprises one or more secondary amines and one or more tertiary amines, as well as one or more hydroxyl groups (e.g., such as secondary hydroxyl groups from the monoepoxide treatment); the non-aqueous aprotic solvent is polar and has a dipole moment (D) of at least 1.7 (e.g., of at least 2, of at least 2.5, of at least 3, from 1.7 to 5, from 1.7 to 4.5, from 1.7 to 4, from 2 to 5, from 2 to 4.5, from 2 to 4, from 2.5 to 5, from 2.5 to 4.5, from 2.5 to 4, from 3 to 5, from 3 to 4.5, or from 3 to 4); the polymeric amine composition has a viscosity at about 25° C. of about 10 cPs or less (e.g., about 7 cPs or less, about 5 cPs or less, about 4 cPs or less, or about 3 cPs or less) and a $CO_2$ adsorption efficiency of at least 0.5:1 moles $CO_2$/moles of primary plus secondary (non-tertiary) amine (e.g., at least 0.7:1 or at least 0.85:1); and the chemisorption complex is reversible at a temperature between 25° C. and 150° C. and includes one or more carbamic acid groups formed from interaction between the $CO_2$ and the primary and/or secondary amines of the composition. Although the chemisorption complex is identified above as including one or more carbamic acid groups, it should be understood that, under certain conditions, a carbamic acid group can lose its acid proton to form an ionic carbamate species, e.g., due to the basicity of the liquid sorbent medium in comparison to the pKa of the acid proton, which is also a reversible phenomenon and is meant to be encompassed by "one or more carbamic acid groups" in this context. However, it is preferable that the ionic carbamate, as much as possible, does not attain an ammonium counterion by utilizing a protonated amine from the liquid sorbent, as such would effectively reduce the efficiency of the sorbent system, because the amine group becoming protonated would otherwise have been capable of reversibly chemisorbing another molecule of $CO_2$ if not made into an ammonium counterion to the already sorbed $CO_2$/ionic carbamate species.

Desorption

The carbon dioxide can be desorbed from the absorbent material by one or more of several methods. One possibility can be to desorb the carbon dioxide by means of stripping with an inert (generally non-reactive) gas stream such as nitrogen in the regeneration tower. The reduction in the $CO_2$ partial pressure that can occur on stripping can promote desorption of the $CO_2$, and, when this expedient is used, a significant pressure reduction may not be required, although the pressure may be reduced for optimal/better stripping, suitably to the levels used in pressure swing operation. Additionally or alternately, a pressure swing process may be used to reduce the pressure on the liquid absorbent to a relatively lower value than that prevailing in the sorption phase.

Figure 7:
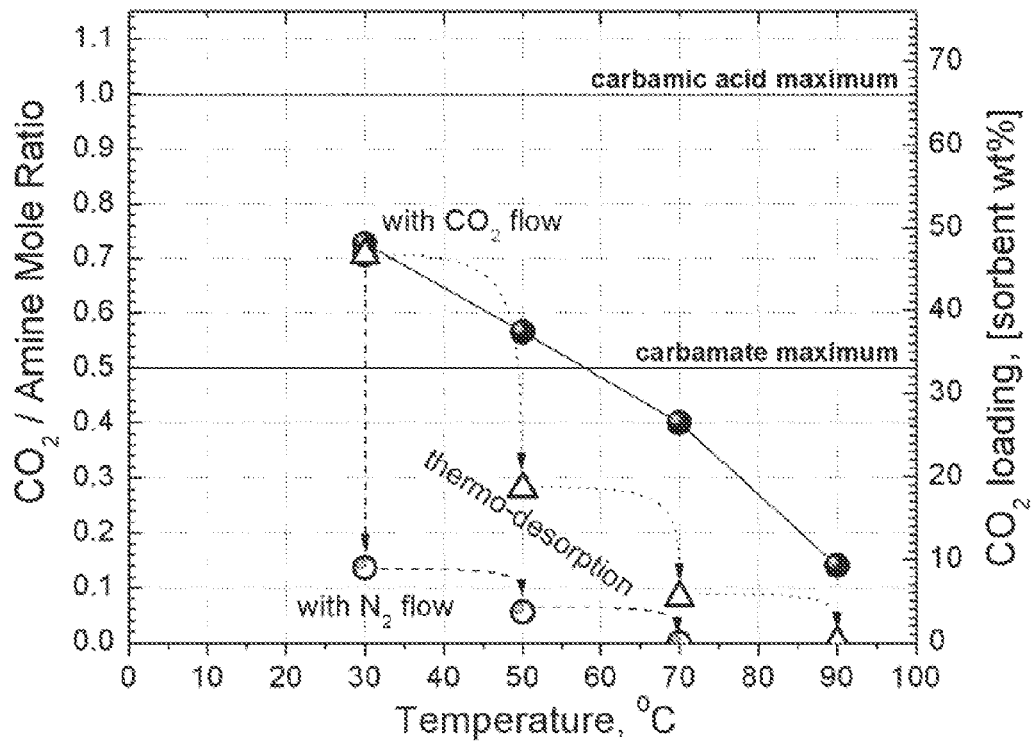
FIG. 7 graphically depicts the $CO_2$ uptake and regeneration curves (purge, thermal) for 15 weight percent 1,5-bis (methylamino)-3-oxapentane (BMAP) in DMSO.

When carrying out desorption by inert gas sparging and/or pressure swing operation, the temperature may be maintained at a value at or close to that used in the adsorption step. As shown in FIG. 7, isothermal desorption may be accomplished by stripping with a suitable amine/solvent combination. Desorption can, however, be favored by an increase in temperature, with or without stripping and/or a decrease in pressure.

There are potential advantages in the regeneration of $CO_2$-rich primary and/or secondary amines in non-aqueous systems, compared to aqueous amine based scrubbing, where the regeneration temperatures are often in the range of 120-140° C. with conventional steam stripping. In the non-aqueous environment of the present process, stripping can be feasible with or without purge gas at relatively lower temperatures. The possibility of desorption at lower temperatures can offer the potential for isothermal or near isothermal stripping using a purge gas at a temperature the same as or not much higher than the sorption temperature, for example, at a temperature not more than 30° C. higher than (or not more than 20° C. higher than) the sorption temperature. When these factors are taken into consideration, the temperature selected for the desorption can typically be in the range from about 70° C. to about 120° C., for example from about 70 to about 100° C. and advantageously not greater than about 90° C. Possible significant energy savings in the range of 20% to 50% over conventional aqueous-based systems can be achieved by the non-aqueous solvent processes of the present invention.

For regeneration in the non-aqueous solvent systems herein, stripping with an inert (non-reactive) gas such as nitrogen or a natural gas stream can be preferred. Staged heat exchanger systems with knock out drums in between where $CO_2$ is removed as a pressurized gas stream may be used as one alternative. An additional or alternative option can be to decompose the carbamate/carbamic acid with substantially pure $CO_2$ (previously isolated) at ~1 atm (~100 kPa partial pressure) or higher at relatively high temperatures, typically at least about 120° C., at which the carbamic acid/carbamate reaction product can be decomposed. Stripping with a $CO_2$ stream at a desorption temperature of at least about 120° C. and at a pressure greater than ~1 atm (~100 kPa partial pressure) may give a significant advantage for the non-aqueous solvent process.

It should be appreciated that conventional equipment can be used, in whole or in part, to perform the various functions of the non-aqueous amine scrubbing processes/steps described herein, such as monitoring and/or automatically regulating the flow of gases, e.g., to enable fully automated and/or continuous process control in an efficient manner.

EXAMPLES

General Procedure for $CO_2$ Uptake and Desorption

The experimental setup for in-situ monitoring $CO_2$ reactions with liquid amines in solution was built inside a wide bore 400 MHz Bruker Avance™ NMR spectrometer. A ~10-mm glass tube with an amine-rich solution was located inside a ~10-mm Broad-Band NMR probe for liquids. A pH-meter was mounted inside the solution above the NMR monitoring region in order not to interfere with NMR signals. A thin sealed capillary with ethylene-glycol was used for accurate temperature and heat release monitoring of the solution during reactions. The $CO_2$ flow through the amine-rich solution was organized by two thin plastic tubes and was controlled by calibrated Brooks 5896™ electronic flow regulators. Solution temperature was controlled by a pre-heated $N_2$ purge (either housing $N_2$ or liquid $N_2$ vapor) flowing at ~1200 L/hr through the probe. A thermocouple was mounted ~10 mm below the sample. The temperature range for experiments was narrower than the NMR instrument capabilities (from about −150° C. up to about +120° C.) and was limited by the amine or solvent physical properties (boiling and freezing points).

$^{13}C$ and $^1H$ spectra taken before, during, and after the reaction gave quantitative information about the starting solution, reaction progress, intermediate products, and characterization of final products.

Desorption experiments were performed by changing the feed gas to $N_2$ at the same flow rate and increasing the solution temperature if needed. For more accurate 1D and 2D NMR analysis, samples were transferred into a ~5-mm NMR tube and measured on a Bruker Avance III™ narrow bore 400 MHz spectrometer using a ~5-mm QNP probe.

For $^{13}C$ NMR quantitative analysis of the starting solution and final product, a standard single-pulse sequence with proton decoupling (zgig pulse sequence) with repetition delay equal or longer than ~60 seconds was used. In order to observe intermediate reaction products qualitatively on a short time scale, NOE signal enhancement (zgpg or zgpg30) was used with a shorter repetition delay of about 2-5 seconds. Further calibration of $^{13}C$ peak intensities was performed after every reaction on the final reaction product by comparing NMR spectra taken with and without NOE enhancement. For $^1H$ NMR quantitative analysis of the starting solution, intermediate products, and final product, single-pulse zg sequence was used with a repetition delay between about 10 and about 60 seconds. Manual tuning and matching procedures of NMR probe were performed between NMR experiments in order to correct impedance changes of $^{13}C$ and $^1H$ circuits during the reaction by the formation of new chemical compounds.

For monitoring aqueous reactions, $H_2O$ or $D_2O$ (heavy water) were used as solvents for the amines. $D_2O$ gave an advantage to analyze $^1H$ spectra more accurately.

For monitoring non-aqueous reactions, several anhydrous molecules were used as solvents for the amine ($d_6$-DMSO, $d_8$-toluene, chloroform, and sulfolane). In order to eliminate solvent influence completely, several amines were treated with $CO_2$ without any solvent. Results of the latter experiments qualitatively showed the presence of similar reaction products as seen in the solvents listed above. It was observed that the protons of the ammonium carbamate counterion (—$NH_3^+$) and carbamic acid (—NH—COO$\underline{H}$) are in fast exchange resulting in a single resonance peak above ~8 ppm. At the same time, the —N$\underline{H}$—COO and —NH—COOH protons of the carbamate and carbamic acid species, respectively, also are seen as a single peak around ~6 ppm. The relative concentration of carbamic acid and carbamate in the solution was verified based on quantitative analysis of these two peaks.

The following Examples show that, in experiments conducted using primary and secondary amines in several non-aqueous solvents, $CO_2$ to amine molar capture ratios exceed the theoretical carbamate maximum of ~0.5:1, reaching as high as ~0.85:1 using a primary amine in $d_6$-DMSO compared to ~0.5:1 in the analogous aqueous solution.

Example 1. Reaction of Aminopropionitrile (APN) with $CO_2$ in $d_6$-DMSO

An approximately 15 wt % solution of 3-aminopropionitrile (APN, $CNCH_2CH_2NH_2$, $pK_a$~7.7) in $d_6$-DMSO was treated with $CO_2$ at about 30° C. as described in the General Procedure. At equilibrium, an ~87 mol % loading of $CO_2$ per APN molecule was achieved, corresponding to ~53.4 wt % loading based on the weight of amine and an ~8.0 wt % loading based on the combined weight of amine and solvent. The $^{13}C$ NMR $CO_2$ resonance which was integrated to determine $CO_2$ uptake appeared at ~158.91 ppm, suggesting carbamic acid (—NH—$\underline{C}$OOH) and carbamate (—NH—$\underline{C}$OO$^-$) species in a fast exchange mode through proton transfer.

The $^1H$ NMR of the reacted solution shows two new resonances at ~10.21 and ~7.29 ppm. The first new peak was associated with protons of carbamic acid (—OH) and carbamate counterion (—$NH_3^+$) in fast exchange. The second new peak was believed to reflect —NH— resonances of both carbamic acid and carbamate species. Based on the relative integration of these two proton peaks and taking into account integration of the $^{13}C$ peak at ~158.91 ppm relative to structural amine peaks at ~120.07 and ~119.13 ppm (—$\underline{C}$≡N), the $CO_2$ loading was calculated as ~87 mol % per amine with a majority of the reaction product in the carbamic acid form (~74.4 mol %) with a minor amount of carbamate species (representing about 25.6% of amines, ~12.8% as carbamate anions, and ~12.8% as ammonium cations).

After saturation with the $CO_2$ at about 30° C., the sample was heated to about 50° C., about 70° C., and finally to about 90° C. under a continuous flow of $CO_2$ at ~1 atm (partial pressure) as described in the General Procedure. The equilibrium loadings of $CO_2$ for these temperatures were ~69.9, ~53.9, and ~34.9 mol %, respectively.

The same procedure was carried out with about ~10 wt %, ~30 wt %, ~50 wt %, and ~70 wt % of APN in DMSO-$d_6$ solution at room temperature (about 24° C.). At higher amine concentrations, the yield attributed to carbamic acid dropped, giving rise to carbamate species; however, at low amine concentrations, a majority of the amine reacted with $CO_2$, forming carbamic acid species, while a small amount of carbamate was detected. As shown in FIG. 2.1, the carbamic acid level exceeded the carbamate level at amine concentrations up to about 50 wt %, although the $CO_2$ loading was ~37 wt % per APN (equivalent to ~25.9 wt % per total solution (APN+DMSO) at ~70 wt % of APN in DMSO) compared to ~21.5 wt % $CO_2$ per (APN+DMSO) at ~50 wt % of APN in DMSO.

Example 1.1. Vapor-Liquid Equilibrium of APN and $CO_2$ in $d_6$-DMSO

An approximately 19.6 wt % solution (~3 molar) of 3-aminopropionitrile (APN) in $d_6$-DMSO was heated to about 45° C. and then treated with a continuous flow of ~1 vol % $CO_2$ in $N_2$ at about 1 atm (about 100 kPaa, or about 0 kPag) as described in the General Procedure. The solution was next treated with ~10 vol % $CO_2$ in $N_2$ at about 1 atm and finally ~100 vol % $CO_2$ at about 1 atm (partial pressure). The equilibrium loading of $CO_2$ at these conditions was ~15.6, ~50.5, and ~90.0 mol %, respectively, and represented an APN/$CO_2$ vapor-liquid equilibrium at ~10 mbar (~1 kPa), ~100 mbar (~10 kPa), and ~1 bar (~100 kPa) of $CO_2$ (partial pressure) at about 45° C.

The same procedure was carried out with fresh ~19.6 wt % (~3 molar) APN in DMSO-$d_6$ solution at temperatures of about 65° C. and about 90° C. The monitoring results shown in FIG. 2.2 indicated a large $CO_2$ uptake capacity (~50.5 mol %) at absorber conditions (~45° C., ~10 vol % $CO_2$) and significantly lower $CO_2$ capacity of the APN solution at ~90° C. The latter result confirms the low stability of the APN-carbamate in DMSO solution, which can be beneficial for achieving easier regeneration.

Example 1.2. Reaction of Aminopropionitrile (APN) with $CO_2$ in $H_2O$

An approximately 15 wt % solution of aminopropionitrile (APN, $CNCH_2CH_2NH_2$) in $D_2O$ was treated with $CO_2$ at ~10° C. as described in the General Procedure. At equilibrium, an ~58.4 mol % loading of $CO_2$ per APN molecule (~40.0 mol % carbamate and ~18.4 mol % (bi)carbonate) was achieved, corresponding to ~36.7 wt % loading based on the weight of amine and an ~5.5 wt % loading based on the combined weight of the amine and solvent. The $^{13}C$ NMR $CO_2$ resonances which were integrated to determine uptake appeared at ~163.79 ppm (attributed to carbamate) and ~160.16 ppm (attributed to carbonate/bicarbonate in equilibrium).

The sample was then heated to ~30° C., ~50° C., ~70° C., and finally to ~90° C., under a continuous flow of $CO_2$ at about 1 atm (partial pressure) as described in the General Procedure. The equilibrium loadings for these temperatures were ~51.3, ~31.8, ~20.8, and ~12.3 mol %, respectively.

A comparison of these results with Example 1, which utilized a non-aqueous solvent, showed that the non-aqueous $CO_2$ sorption process with a weak base gave an advantage over the analogous aqueous process in the amount of captured $CO_2$. This observation can be explained by the lower affinity of weakly basic amines (pKa<~8) to function as Bronsted bases, i.e., to accept a proton and form carbamate and/or (bi)carbonate in aqueous solution. These weakly basic amines may, however, have a relatively large affinity to function as Lewis bases (nucleophiles) towards $CO_2$ under non-aqueous conditions and can form either zwitterions or carbamic acids or their ionic pairs with higher total $CO_2$ loading in the non-aqueous system.

The same procedure was carried out with about 10 wt %, about 30 wt %, about 50 wt %, and about 70 wt % of APN in $D_2O$ solution. A majority of the reaction products of APN and $CO_2$ were detected in the carbamate form, while less than ~15 mol % of APN formed a bicarbonate with $CO_2$ (leading to much lower total $CO_2$ uptake capacity per amine relative to Example 1). In $D_2O$ solution, the total $CO_2$ loading did not exceed ~0.54:1 $CO_2$:amine at ~10-70 wt % concentrations of APN in $D_2O$. This demonstrated the $CO_2$ loading capacity advantage of a non-aqueous solvent over a broad amine concentration range.

Example 2. Reaction of 2-Ethoxyethylamine (2EEA) with $CO_2$ in $d_6$-DMSO

An approximately 15 wt % solution of 2EEA ($CH_3CH_2OCH_2CH_2NH_2$, $pK_a$~8.92) in $d_6$-DMSO was treated with $CO_2$ at about 30° C. as described in the General Procedure. The $^{13}C$ NMR $CO_2$ resonance which was integrated to determine uptake appeared at ~158.84 ppm. At equilibrium, ~91 mol % loading of $CO_2$ per amine group was achieved, corresponding to ~45.0 wt % loading based on the weight of amine and ~6.7 wt % loading based on the combined weight of the amine and solvent.

The sample was then heated to about 50° C., about 70° C., and about 90° C., under a continuous 1 atm (partial pressure) of $CO_2$ as described in the General Procedure. The equilibrium loadings for these temperatures are shown in Table 1 below.

Figure 3:
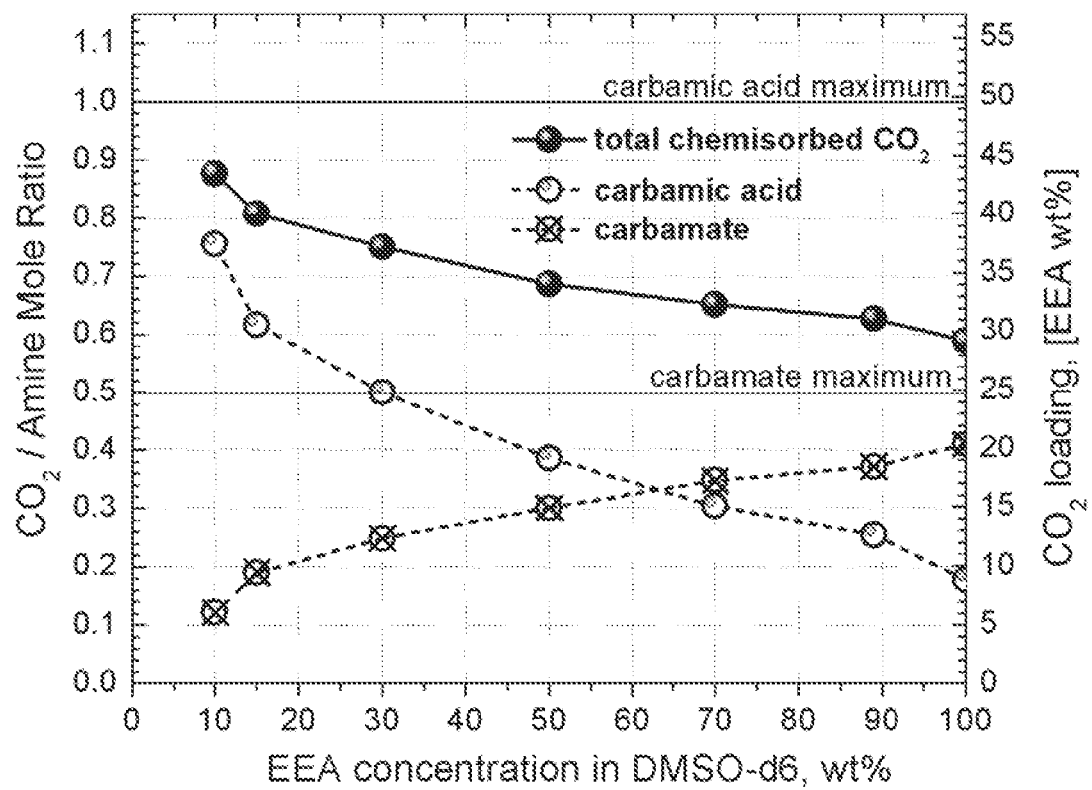
FIG. 3 graphically depicts the $CO_2$ reaction with 2-ethoxyethylamine (2EEA) at 30° C. in dimethyl sulfoxide (DMSO) at different concentrations.

The same procedure was carried out with about 10 wt %, about 30 wt %, about 50 wt %, about 70 wt %, and about 90 wt % of 2EEA in $d_6$-DMSO solution and using a neat 2EEA sample at room temperature (~24° C.). At relatively low amine concentrations (e.g., relatively higher concentrations of non-aqueous solvent), the indication was that a majority of amine reacted with $CO_2$ forming carbamic acid species, with only a small amount of carbamate detected. At relatively higher amine concentrations, the amount of the carbamate species was indicated to increase with a consequential drop in the carbamic acid yield. The monitoring results shown in FIG. 3 indicating the carbamic acid and carbamate species show that carbamic acid was the dominant species at amine concentrations up to about 63 wt %, while the total $CO_2$ loading capacity per amine+solvent ($CO_2$ loading per EEA at the tested APN concentrations in DMSO) was ~17 wt % $CO_2$ at ~50 wt % of EEA in DMSO, ~22.7 wt % $CO_2$ at ~70 wt % EEA in DMSO, and ~27.9 wt % of $CO_2$ at ~90 wt % EEA in DMSO.

In neat 2EEA, about 18 mol % of the 2EEA formed carbamic acid products with a ~1:1 $CO_2$:amine ratio (the other ~82 mol % of 2EEA amines formed carbamates) which led to a $CO_2$ loading greater than 0.5:1 per amine. The results for the neat $d_6$-DMSO are summarized in Table 1.

The procedure was then repeated with analogous ~15 wt % solutions of 2EEA in de-toluene and sulfolane. FIG. 4 illustrates the reaction of the ~15 wt % 2EEA solutions with $CO_2$ at a temperature of ~30° C. in DMSO, sulfolane, and toluene. In all cases the equilibrium $CO_2$ to amine molar ratio was greater than 0.5:1, with the greatest being ~0.85:1 in $d_6$-DMSO.

Desorption of $CO_2$ from the loaded sample was studied in two ways, which are shown in FIG. 5: $CO_2$ desorption with nitrogen purge (open circles), and by $CO_2$ thermal desorption (open triangles). In the first case, the amine sample saturated with $CO_2$ at ~30° C. was desorbed by a $N_2$ purge (~10 cc/min) for about 20 hours, then heated to ~50° C. for about 17 hours, and to ~70° C. for about 1 hour, at which point all reaction products were gone. Dropping the $CO_2$ partial pressure by purging with nitrogen allowed for complete regeneration by ~70° C. In the second case, the amine sample saturated with $CO_2$ at ~30° C. was regenerated by simple thermal desorption in the absence of fresh $CO_2$, without any purge gas, by maintaining the solution at ~30° C. for about 1 month, at ~50° C. for about 15 hours, at ~70° C. for about 9 hours, and at ~90° C. for about 12 hours. The reaction products were stable at room temperature (about 24° C.) but began to decompose at ~50° C. After ~90° C. regeneration, all $CO_2$ was completely desorbed. FIG. 5 shows that ~49% of the $CO_2$ was removed by thermal regeneration at ~70° C. in the presence of a finite partial pressure of $CO_2$.

Example 2.1. Reaction of 2EEA with $CO_2$ in $H_2O$

An approximately 15 wt % solution of 2EEA ($CH_3CH_2OCH_2CH_2NH_2$) in $H_2O$ was treated with $CO_2$ at ~10° C. as described in the General Procedure. At equilibrium, ~90 mol % loading of $CO_2$ per amine group (~15 mol % carbamate and ~75 mol % (bi)carbonate) was achieved, corresponding to ~44.5 wt % loading based on the weight of amine and ~6.7 wt % loading based on the combined weight of the amine and solvent. The $^{13}C$ NMR $CO_2$ resonances which were integrated to determine uptake appeared at ~164.51 ppm (attributed to carbamate) and ~160.68 ppm (attributed to carbonate/bicarbonate in equilibrium).

The sample was then heated to ~30° C., ~50° C., ~70° C., and ~90° C., under a continuous 1 atm (partial pressure) of $CO_2$ as described in the General Procedure. The equilibrium loadings at these temperatures are shown in Table 1. The total $CO_2$ loading was similar in both solutions with a small advantage for the DMSO solution at ambient temperature. However, different reaction products—carbamate and (bi)carbonate in aqueous solution and carbamic acid pairs in non-aqueous solution—were believed to play a key role for $CO_2$ desorption and amine regeneration.

The same procedure was carried out with about 10 wt %, about 30 wt %, about 50 wt %, about 70 wt %, and about 90 wt % of 2EEA in $D_2O$ solution at room temperature (about 24° C.). At relatively low amine concentrations, a majority of amines can react with $CO_2$ forming bicarbonate species with a ~1:1 $CO_2$:amine mole ratio, while only a small amount of carbamate was detected. At relatively higher amine concentrations, bicarbonate yield dropped, giving rise to carbamate species. The $CO_2$ loading in non-aqueous solution was similar to that in aqueous solution over the broad amine concentration range, but the difference in reaction products (carbamate and bicarbonate in aqueous solution, and carbamic acid pairs in non-aqueous solution) was believed to play a key role facilitating $CO_2$ desorption and amine regeneration.

The $CO_2$ desorption curves for the $CO_2$-saturated sample show that the solution was fully regenerated in non-aqueous solution with nitrogen bubbling through the solution by ~70° C. The residual loading after heating at ~50° C. for about 17 hours was ~13.5 mol % and was ~0.5 mol % residual loading after about 1 hour at ~70° C. At nearly equal total $CO_2$ loadings, the products of the non-aqueous reaction with $CO_2$ were less stable than the aqueous reaction products, which situation provides the substantial advantage of a smaller temperature swing required for a similar $CO_2$ working capacity. Thus, lower advantageous regeneration temperatures are possible in non-aqueous amine systems with both pure thermal and partial pressure drop-assisted desorption processes.

TABLE 1

Summary of Non-Aqueous Amine $CO_2$ Absorption with 2EEA

| Solvent | Amine Conc. (wt %) | Temp (° C.) | Total Loading (mol %) |
|---|---|---|---|
| DMSO | 15 | 30 | 85 |
| $d_6$-DMSO | 15 | 30 | 91 |
| $d_6$-DMSO | 15 | 50 | 60 |
| $d_6$-DMSO | 15 | 70 | 58 |
| $d_6$-DMSO | 15 | 90 | 52 |
| Sulfolane | 15 | 30 | 60 |
| $d_8$-Toluene | 15 | 30 | 60 |
| neat | 100 | 24 | 58 |
| $H_2O$ | 15 | 10 | 93 |
| $H_2O$ | 15 | 30 | 68 |
| $H_2O$ | 15 | 50 | 66 |
| $H_2O$ | 15 | 70 | 54 |
| $H_2O$ | 15 | 90 | 44 |

Example 3. Reaction of 1,5-Diamino-3-Oxapentane (DAOP) with $CO_2$ in $d_6$-DMSO A procedure similar to that described in Example 1 was performed using an aqueous solution of a bifunctional analogue of 2EEA, 1,5-diamino-3-oxapentane (DAOP, $NH_2CH_2CH_2OCH_2CH_2NH_2$, $pK_a$~9.07). At concentrations higher than ~9.9 wt % in DMSO solution, DAOP molecules appeared to form a very viscous gel (in some cases, a rigid structure) during reaction with $CO_2$. The observed polymerization-like effect was presumably due to the difunctionality of molecules and strong intermolecular interactions. Since the detected $CO_2$ loading before gel formation (~56.8 mol % per amine) was higher than the theoretical maximum for ammonium carbamate products, such strong intermolecular interactions implied formation of intermolecular zwitterion/carbamic acid ion H-bonded pairs (in both cases $CO_2$ loading may exceed 50 mol %) and/or a large amount of carbamate species. The proton NMR spectrum of DAOP under $CO_2$ treatment showed two low-field peaks at ~9.77 and ~7.36 ppm, similar to what was observed with monofunctional 2EEA and APN molecules in all non-aqueous solvents, implying a chemical similarity of $CO_2$ reaction products between 2EEA and DAOP in non-aqueous solution.

Example 3.1. Reaction of 1,5-diamino-3-oxapentane (DAOP) with $CO_2$ in $D_2O$

An approximately 14 wt % solution of DAOP in $D_2O$, containing a sealed ethylene-glycol filled capillary, was treated with $CO_2$ at ~10° C. as described in the General Procedure. The equilibrium loading was ~172 mol % at ~10° C. and ~160 mol % at ~30° C. (~86 mol % and ~80 mol %, respectively, of $CO_2$ per each amine of DAOP), similar to the results for 2EEA in $H_2O$.

Desorption of $CO_2$ from the loaded sample was studied by purging $N_2$ gas through the $CO_2$-saturated DAOP solution. The amine sample saturated with $CO_2$ at ~30° C. was desorbed by a $N_2$ purge (~10 cc/min) while heating at ~50° C. for about 3 hours, at ~70° C. for about 3 hours, and at ~90° C. for about 14 hours. The remaining loading at ~90° C. after this procedure was ~6.8 mol % amine. Thus, purging with nitrogen allows for nearly complete regeneration by ~90° C.

At nearly equal total $CO_2$ loading, the products of the non-aqueous reaction were less stable than those for the aqueous reaction process, which gave a substantial advantage in higher $CO_2$ working capacity with a smaller temperature differential between the sorption and desorption. Advantageously lower regeneration temperatures are thus possible in non-aqueous amine systems with both pure thermal and partial pressure drop-assisted desorption processes.

Example 4. Reaction of Monoethanolamine (MEA) with $CO_2$ in $d_6$-DMSO

An approximately 15 wt % solution of MEA ($HOCH_2CH_2NH_2$, $pK_a$~9.44) in $d_6$-DMSO was treated with $CO_2$ at ~30° C. as described in the General Procedure. At equilibrium, ~66.8 mol % loading of $CO_2$ per amine group was achieved, corresponding to a ~48.2 wt % loading based on the weight of amine and a ~7.2 wt % loading based on the combined weight of the amine and solvent, as shown in FIG. 6.1. The $^{13}C$ NMR $CO_2$ resonance which was integrated to determine uptake appeared at ~160.78 ppm. $^1H$ NMR on the reacted solution shows two downfield peaks around 8.1 and around 7.0 ppm. The position and integration of these $^1H$ peaks were close to those discussed in Examples 1, 2, and 3, and suggest formation of similar carbamic acid/zwitterion pairs as reaction products.

Example 4.1. Vapor-Liquid Equilibrium of MEA and $CO_2$ in $d_6$-DMSO

An approximately 24.8 wt % (~5 molar) solution of monoethanolamine (MEA) in $d_6$-DMSO was heated to about 45° C. and then treated with a continuous flow of ~1 vol % $CO_2$ in $N_2$ at about 1 atm (about 100 kPaa, or about 0 kPag) as described in the General Procedure. The solution was next treated with ~10 vol % $CO_2$ in $N_2$ at about 1 atm (about 100 kPaa, or about 0 kPag), and finally ~100 vol % $CO_2$ at about 1 atm (partial pressure). The equilibrium loading of $CO_2$ at these conditions was ~46.2, ~67.8, and ~72.2 mol %, respectively and represented a MEA/$CO_2$ vapor-liquid equilibrium at ~10 mbar (~1 kPa), ~100 mbar (~10 kPa), and ~1 bar (~100 kPa) of $CO_2$ (partial pressure) at about 45° C.

The same procedure was carried out with fresh ~5 molar MEA in DMSO-$d_6$ solution at ~65° C. and ~90° C. The monitoring results shown in FIG. 6.2 indicated not only a relatively large $CO_2$ uptake capacity (~67.8 mol %) at absorber conditions (~45° C., ~10 vol % $CO_2$), but also relatively high $CO_2$ loading at relatively low $CO_2$ fugacity (~46.2 mol % at ~45° C., ~1 vol % $CO_2$). These results confirmed that a non-aqueous solution of MEA can effectively capture more than 90% $CO_2$ from flue gas with high capacity. Based on relatively high $CO_2$ loading at ~65° C. (FIG. 6.2), non-aqueous amine solutions can also be used for $CO_2$ capture at elevated temperatures (>60° C.), which decreases the hardware and corresponding cost of flue gas cooling.

Example 4.2. Reaction of MEA with $CO_2$ in $D_2O$

An approximately 15 wt % solution of MEA in $D_2O$ was treated with $CO_2$ at ~10° C. as described in the General Procedure. At equilibrium, an ~85.7 mol % loading of $CO_2$ per amine group (~15.9 mol % carbamate and ~69.8 mol % bicarbonate) was achieved, corresponding to ~61.8 wt % loading based on the weight of amine and ~9.3 wt/o loading based on the combined weight of the amine and solvent. $^{13}C$ NMR $CO_2$ resonances which were integrated to determine uptake appeared at 164.7 ppm (attributed to carbamate) and ~160.7 ppm (attributed to carbonate/bicarbonate in equilibrium).

The sample was then heated to ~30° C., ~50° C., ~70° C., and finally to ~90° C., under a continuous 1 atm (partial pressure) of $CO_2$, as described in the General Procedure. The bicarbonate is typically unstable at elevated temperatures. The total $CO_2$ loading in aqueous MEA solution can be controlled by bicarbonate at low temperature and by carbamate at high temperatures; with the formation of the carbamate product (2:1 amine:$CO_2$), the capture ratio of the $CO_2$ tends to become lower. At higher temperatures, the carbamate product tends to be stable in the presence of $CO_2$ gas and tends to decompose only slowly in the absence of a $CO_2$ partial pressure.

Subsequently, the ~15 wt % MEA sample in aqueous solution was re-saturated with $CO_2$ at ~30° C., and desorption properties were examined by purging $N_2$ through the solution at different temperatures. Similarly to DAOP in aqueous solution, complete amine regeneration of aqueous MEA solution is possible starting at ~90° C. by dropping the $CO_2$ partial pressure.

Example 5. Reaction of 1,5-Bis(Methylamino)-3-Oxapentane (BMAP) with $CO_2$ in $d_6$-DMSO An approximately 15 wt % solution of $CH_3NHCH_2CH_2OCH_2CH_2NHCH_3$ (BMAP, $pK_a$~9.87) in $d_6$-DMSO was treated with $CO_2$ at ~30° C. as described in the General Procedure. At equilibrium, a ~74.0 mol % loading of $CO_2$ per amine group was achieved, corresponding to ~50.1 wt % loading based on the weight of amine and ~7.5 wt % loading based on the combined weight of the amine and solvent. The $^{13}C$ NMR $CO_2$ resonance which was integrated to determine uptake appeared at ~158.58 ppm.

In contrast to previously discussed primary amines with two protons on the amine nitrogen, BMAP has only one —NH— proton, which can be transferred to other atoms. $^1H$ NMR on the reacted solution showed one downfield peak at ~10.15 ppm, which was believed to correspond to the —OH and —$NH_2^+$— groups of carbamic acid and carbamate in fast equilibrium. The position and integration of this $^1H$ peak was close to those discussed in Examples 1 to 4, and thus suggested formation of carbamic acid and carbamate in equilibrium.

After saturation at ~30° C., the sample was then heated to ~50° C., ~70° C., and ~90° C., under a continuous 1 atm of $CO_2$ (partial pressure) as described in the General Procedure. The equilibrium loadings for these temperatures were approximately 56 mol %, ~40 mol %, and ~14 mol % (~74 mol % at ~30° C. equilibrium). This $CO_2$/amine loading was slightly lower than that for the primary amine 2EEA in the same DMSO solvent but was still higher than theoretical maximum for stable carbamate formation.

Desorption of the $CO_2$ from the loaded BMAP sample was studied in two ways, and the results are shown in FIG. 7: $CO_2$ desorption with nitrogen purge (open circles); and $CO_2$ thermal desorption (open triangles). In one case, the amine sample saturated with $CO_2$ at ~30° C. was regenerated by simple thermal desorption in the absence of fresh $CO_2$, without any purge gas, by maintaining the sample at ~30° C. until equilibrium, then at ~50° C., at ~70° C., and at ~90° C. The reaction products were stable at ambient temperature and began to decompose at ~50° C. After ~90° C., regeneration of $CO_2$ appeared to be complete. In the second case, the amine sample saturated with $CO_2$ at ~30° C. was desorbed by a $N_2$ purge (~10 cc/min) until equilibrium at ~30° C., then heated to 50° C., and then to ~70° C., at which point all reaction products were gone. Dropping $CO_2$ partial pressure by purging with nitrogen allowed for complete amine regeneration ($CO_2$ desorption) by ~70° C. Thermal regeneration was effective as well; residual $CO_2$ loading was less than 10% at ~70° C. in the presence of a finite partial pressure of $CO_2$.

Example 5.1. Reaction of BMAP with $CO_2$ in $D_2O$

An approximately 15 wt % solution of BMAP in $D_2O$ was treated with $CO_2$ at ~10° C. as described in the General Procedure. At equilibrium, a ~97.6 mol % loading of $CO_2$ per amine group (~1.9 mol % carbamate and ~95.6 mol % bicarbonate) was achieved, corresponding to ~66.1 wt % loading based on the weight of amine and ~9.9 wt % loading based on the combined weight of the $CO_2$, amine, and solvent. $^{13}C$ NMR $CO_2$ resonances at ~30° C. which were integrated to determine uptake appeared at ~164.1 ppm (attributed to carbamate) and 160.6 ppm (attributed to carbonate/bicarbonate in equilibrium).

The sample was then heated to ~30° C., ~50° C., ~70° C., and ~90° C., under a continuous 1 atm of $CO_2$ (partial pressure) as described in the General Procedure. The equilibrium loadings for these temperatures were approximately 90 mol %, ~72 mol %, ~55 mol %, and ~38 mol %.

Figure 8:
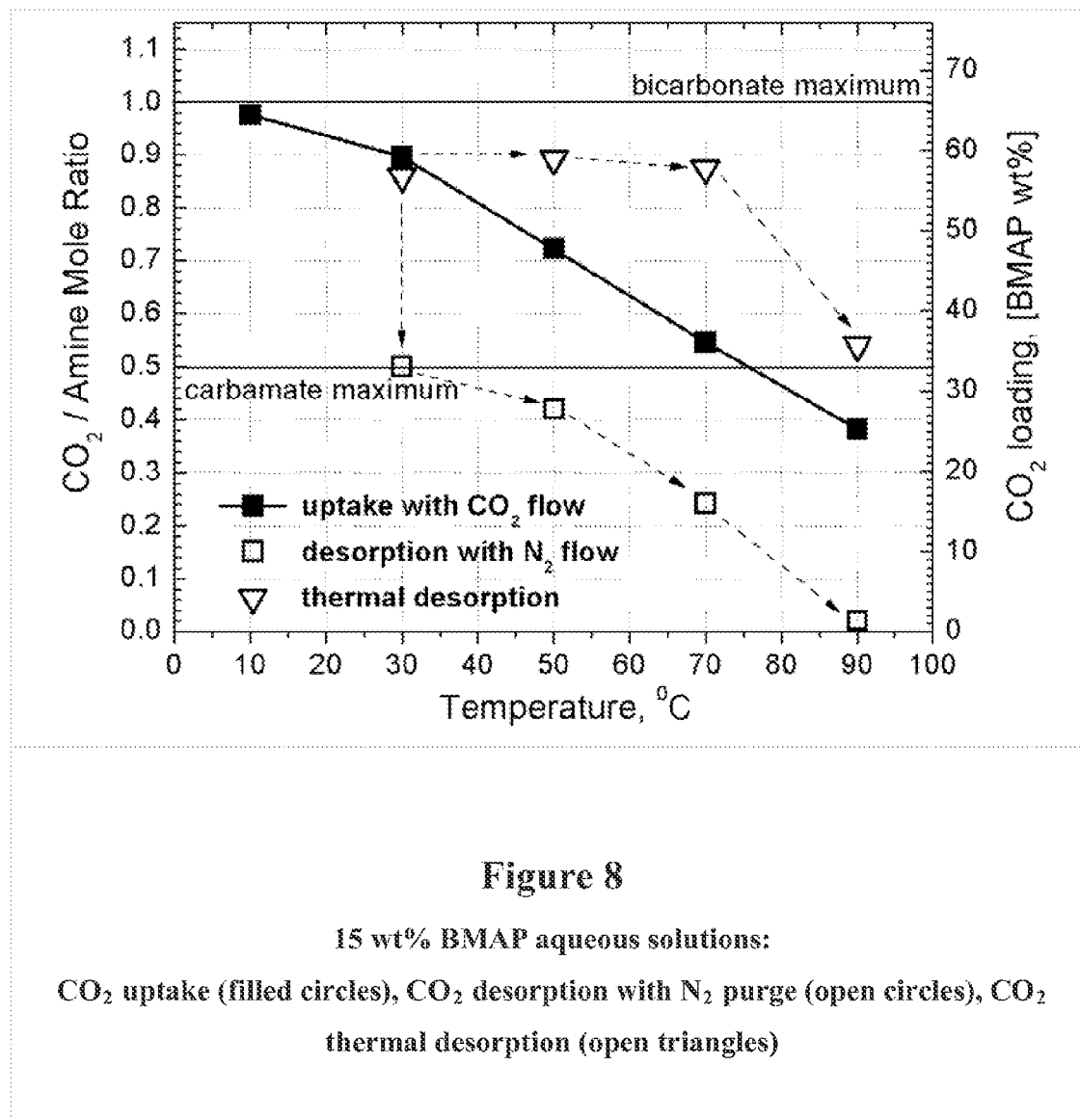
FIG. 8 graphically depicts the $CO_2$ uptake and regeneration curves (purge, thermal) for 15 weight percent 1,5-bis (methylamino)-3-oxapentane (BMAP) in water.

The $CO_2$ uptake and regeneration curves for the BMAP in $d_6$-DMSO and $D_2O$ samples generated in Examples 5 and 5.1 are shown in FIGS. 7 and 8, respectively. Although the BMAP $CO_2$/amine loading in $d_6$-DMSO was slightly lower than that for the BMAP $CO_2$/amine loading in $D_2O$, the regeneration energy requirements were also lower. All of the $CO_2$ can be removed from BMAP/$CO_2$ in $d_6$-DMSO at ~70° C. with a nitrogen purge (bubbling for about 24 hours at ~30° C., heating at ~50° C. for about 4 hours, and heating at ~70° C. for about 4 hours), whereas the residual $CO_2$ loading in BMAP/$CO_2$ in $D_2O$ at ~70° C. was about 24.3 mol % per amine (after $N_2$ bubbling for about 14 hours at ~30° C., heating at ~50° C. for about 3 hours, heating at ~70° C. for about 6 hours, and heating at ~90° C. for about 12 hours). Chemisorbed $CO_2$ was not completely removed from BMAP in the $D_2O$ sample after about 12 hours of nitrogen purge at ~90° C. (residual $CO_2$ loading≈2.1 mol % per amine). This exemplifies a significant advantage of a non-aqueous amine solution over an aqueous solution for a more energy efficient $CO_2$ capture process, based on a smaller temperature swing requirement for $CO_2$ sorption/desorption.

For pure thermal desorption of $CO_2$ from the BMAP/$CO_2$ in $d_6$-DMSO sample in the absence of a purge gas, ~85% of the $CO_2$ (~8.3 mol % per amine remaining loading) was removed at ~70° C., and ~100% (~0 mol % remaining loading) at ~90° C. (by heating at ~50° C. for about 15 hours, heating at ~70° C. for about 5 hours, and heating at ~90° C. for about 3 hours). The reaction products formed with BMAP/$CO_2$ in $D_2O$ were much more stable than those formed in $d_6$-DMSO, and $CO_2$ thermal desorption was not efficient up to ~70° C., where the BMAP/$CO_2$ sample began to release $CO_2$. The residual $CO_2$ loading in the $D_2O$ BMAP/$CO_2$ sample at ~90° C. was still ~54 mol % per amine, whereas $CO_2$ was completely released from BMAP/$CO_2$ in $d_6$-DMSO by ~90° C.

Example 6. Reaction of a Reduced-Primary-Amine PEI with $CO_2$ in $d_6$-DMSO

A reaction between a pre-mixed solution of polyethyleneimine (PEI) having an $M_n$ of about 600 g/mol (commercially available from Aldrich Chemical of Milwaukee, Wis.) and about 7 equivalents of 1,2-monoepoxyhexane (MEH) was conducted at about 70° C. according to the reaction scheme in FIG. 9 to form a partially epoxylated PEI sorbent material, which was confirmed using $^{13}C$ NMR. In the product PEI, a portion of the primary and secondary amine groups reacted with the MEH (for primary amines, either with one or two equivalents) to form new secondary and tertiary amines. FIG. 9 is a generalized representation of the possible types of amine groups present in the PEI before and after epoxylation. The amine distribution of the PEI in solution was ~5.6:~5.0:~3.4 primary:secondary:tertiary amines; after reaction with MEH, the amine type distribution was ~1.6:~6.0:~6.4.

The epoxylated PEI was dissolved in $d_6$-DMSO in an ~8 inch, ~10 mm NMR tube to make approximately a 10 wt % solution. The solution was exposed to a $CO_2$ purge (~100 kPa partial pressure at ~10 cc/min, measured by a Brooks 5896 flow controller) via a plastic capillary dip tube at about 24° C. inside a ~10 mm wide-bore Bruker Avance 400 MHz NMR spectrometer with a BBO probe. The $^1H$ and $^{13}C$ NMR spectra were monitored until no further $CO_2$ uptake (as evidenced by a broad —N—$\underline{C}$($O_2$)— $^{13}C$ NMR carbonyl resonance at ~159 ppm and a smaller, sharp resonance at 124-125 ppm, attributed to physisorbed $CO_2$) was observed. The polymer solution remained clear and fully soluble even at substantially complete $CO_2$ saturation, and it was possible to reverse $CO_2$ uptake by bubbling $N_2$ through the solution; in contrast, a similar comparative $CO_2$ uptake experiment using the nonepoxylated starting PEI produced an agglomerated gel.

Integrating the carbonyl peaks versus the total aliphatic (polymer) integral (mmol $CO_2$ per mmol relevant amine(s)) yielded calculated loadings of ~20.7 weight % chemisorbed $CO_2$ (corresponding to an ~83% molar loading of $CO_2$ per primary+secondary amine groups) and ~5.6 weight % physisorbed $CO_2$. Without being bound by theory, the unexpected observation of $CO_2$ physisorption in this Example can potentially be explained by the two secondary hydroxyl groups attached to the beta carbons from each now-tertiary diepoxylated amine group facilitating the physisorption of $CO_2$ through an unknown mechanism, possibly hydrogen-bonding.

In a similar manner, a PEI having an $M_n$ of about 600 g/mol (commercially available from Aldrich Chemical of Milwaukee, Wis.) was reacted with about 6 equivalents of MEH (added dropwise) at ~50° C. to form a partially epoxylated polymer with an amine distribution of ~2.5:~5.7:~5.8 primary:secondary:tertiary. This polymer, when similarly treated with $CO_2$ at ~30° C. as a ~15 wt % solution in $d_6$-DMSO, showed a chemisorptive $CO_2$ uptake of 19.7 wt % (corresponding to a ~61% molar loading of $CO_2$ per primary+secondary amine groups) plus an additional ~2.1 wt % physisorbed $CO_2$.

Also in a similar manner, a PEI having an $M_n$ of about 600 g/mol (commercially available from Aldrich Chemical of Milwaukee, Wis.) was reacted with about 6 equivalents of MEH (added dropwise) at ~90° C. to form a partially epoxylated polymer with an amine distribution of ~2.3:~5.8:~5.9 primary:secondary:tertiary. This polymer, when similarly treated with $CO_2$ at 30° (as a ~15 wt % solution in $d_6$-DMSO, showed a chemisorptive $CO_2$ uptake of ~17.5 wt % (corresponding to a ~60% molar loading of $CO_2$ per primary+secondary amine groups) plus an additional ~5.4 wt % physisorbed $CO_2$. When treated with $CO_2$ at ~50° C., the polymer showed only a chemisorptive $CO_2$ uptake of ~12.9 wt % (corresponding to a 44% molar loading of $CO_2$ per primary+secondary amine groups).

The following Examples 7-10 demonstrate the epoxidation of the difunctional amines of Examples 3 and 5 (rather than PEI as in Example 6) using additional epoxides, having varying structures and varying selectivities in their reaction with amines, to control the generation of secondary versus tertiary amines and sites with one versus two epoxy-derived substitutents. These selectively epoxylated amine products also react with $CO_2$ in DMSO solution. An example of these additional modification techniques to PEI is given in Example 11.

Example 7. Modification of DAOP with MEH and Reaction of Product with $CO_2$ in $d_6$-DMSO 1,5-diamino-3-oxapentane (DAOP, the amine of Example 3) was reacted as an approximately 10 wt % solution in $d_6$-DMSO with slightly over 4 equivalents of MEH at ~90° C. for ~30 days, to form a fully epoxylated product with two MEH units attached to each amine group. The $^{13}$C NMR resonances attributed to the MEH-derived carbons attached to the N and O atoms showed splitting indicative of different diastereomeric or regioisomeric structures (in addition to possible regioisomers formed from nucleophilic N attack at the secondary versus primary epoxy carbons of MEH, more likely diastereomeric structures may result from neighboring different enantiomeric configurations of —NCH$_2$CH(OH)— substituents on the same N atom). The solution containing this product was then treated with $CO_2$ at ~30° C., as previously described, for about 7 hours. In contrast to Example 3, no chemisorption of $CO_2$ was observed; however, in a similar manner to Example 6, physisorbed $CO_2$ ($^{13}$C NMR resonance at ~124-125 ppm) was present at a loading of ~0.72 mol $CO_2$ per molecule of epoxylated product.

In a similar manner, DAOP (~0.26 g, ~2.5 mmol) was reacted with approximately 2 equivalents of MEH (~0.48 g, ~4.8 mmol) in ~6.58 g $d_6$-DMSO in a ~10 mm NMR tube (~10 wt % solution) at ~75° C. for about 6 days. Periodically, the tube was cooled to room temperature and an aliquot was removed for $^{13}$C NMR analysis (and then returned to the tube). $^{13}$C NMR of the sample distinguished between unreacted, monoepoxylated, and diepoxylated amine groups but not between entire 2,2'-oxybis(ethylamine) molecules with 0, 1, 2, 3, or 4 epoxide substituents. The distribution of amine sites in the sample by $^{13}$C NMR on Day 5 was as follows: ~28% primary, ~56% monoepoxylated (secondary), and ~16% diepoxylated (tertiary). The ratio of primary amine monoepoxylation to diepoxylation products was approximately 78:22. Relevant product $^{13}$C NMR assignments (ppm): ~72.77 (3 peaks, unreacted amine —OCH$_2$CH$_2$NH$_2$), ~70.04 (2 peaks, monoepoxylated amine —OCH$_2$CH$_2$NH—), ~69.13 (monoepoxylated amine —NHCH$_2$C(OH)—), ~68.78 (2 peaks, diepoxylated amine —OCH$_2$CH$_2$N<), ~68.31 and ~67.53 (diepoxylated amine —NCH$_2$C(OH)— diastereomers), ~62.66 and ~61.87 (diepoxylated amine —NCH$_2$C(OH)— diastereomers), ~55.85 (monoepoxylated amine —NHCH$_2$C(OH)—), ~54.52 (br, diepoxylated amine —OCH$_2$CH$_2$N<), ~48.92 (2 peaks, monoepoxylated amine —OCH$_2$CH$_2$NH—), ~41.33 (2 peaks, unreacted amine —OCH$_2$CH$_2$NH$_2$), ~34.86 (monoepoxy —C(OH)CH$_2$Pr), ~34.37 (2 peaks, diepoxy —C(OH)CH$_2$Pr), ~27.53 (2 peaks, all epoxy —CH$_2$CH$_2$CH$_3$), ~22.33 (2 peaks, all epoxy —CH$_2$C(H$_3$), and ~13.98 (all epoxy —CH$_3$).

Example 8. Selective Modification of DAOP with Cyclohexene Oxide and Reaction of all-Secondary-Amine Product with $CO_2$ in $d_6$-DMSO A procedure identical to that described in Example 7 was carried out using ~261.5 mg (~2.5 mmol) 2,2'-oxybis(ethylamine), ~491.2 mg (~0.5 mmol) cyclohexene oxide (1,2-epoxycyclohexane), and ~6.7 g $d_6$-DMSO. After about 3 days at ~75° C., roughly quantitative formation of a singly epoxylated product was observed (one cyclohexene oxide addition per amine) with the $^{13}$C NMR spectrum information given below. An additional ~6 equivalents of cyclohexene oxide were added (~1.5 g, ~15.3 mmol), and the solution was heated at ~75° C. for an additional ~7 days, then at ~90° C. for an additional ~4 days, and then at ~110° C. for an additional ~2 days to give a deep red solution. No formation of diepoxylated products was observed in the product. Relevant product $^{13}$C NMR assignments (ppm): ~72.84 (very small, residual amine —OCH$_2$CH$_2$NH$_2$), ~72.67 (2 peaks, cyclohexyl —NHCH—), ~70.30 and ~70.23 (amine —OCH$_2$CH$_2$NH—), ~63.03 (cyclohexyl —CH(OH)—), ~51.26 (unreacted cyclohexene oxide —CH(O)—), ~46.05 (2 peaks, amine —OCH$_2$CH$_2$NH—), ~41.42 (very small, residual amine —OCH$_2$CH$_2$NH$_2$), ~33.99, ~29.94, ~24.30, and ~24.19 (cyclohexyl ring —CH$_2$—), and ~24.00 and ~19.09 (unreacted cyclohexene oxide ring —CH$_2$—). The amount of unreacted 2,2'-oxybis(ethylamine)-NH$_2$ groups was estimated to be ≤~3%.

A portion of this product solution (removed prior to heating at ~90° C.) was treated to a $CO_2$ purge at room temperature for approximately 24 hours. The resultant $^{13}$C NMR spectrum showed partial chemisorption of $CO_2$ (at ~159 ppm) and partial physisorption of $CO_2$ (at ~124-125 ppm). New structural peaks attributed to the epoxylated diamine-$CO_2$ product appeared at (ppm): ~69.39 (amine —OCH$_2$— and/or cyclohexyl —NCH<), ~62.22 (cyclohexyl —CH(OH)—), ~43.21 (amine —CH$_2$NH—), and ~35.53 and ~25.61 (cyclohexyl ring —CH$_2$—).

As further proof of the selectivity of cyclohexene oxide for not producing diepoxylated tertiary amine structures, the secondary diamine of Example 5 (BMAP, ~0.354 g, ~2.67 mmol) was reacted with about 6 equivalents of cyclohexene oxide (~1.84 g, ~18.8 mmol) in ~16.3 g of $d_6$-DMSO at ~75° C. for about 5.5 hours; no reaction was observed. Only after raising the temperature to ~110° C. for an additional ~21.5 hours, did $^{13}$C NMR analysis indicate even partial formation of an epoxylated product, with epoxylated amine groups present as less than ~13 mol % of the total.

Example 9. Selective Modification of DAOP with 1,2-Epoxy-2-Methylbutane

A procedure similar to that described in Example 7 was performed using ~0.28 g (~2.7 mmol) DAOP, ~0.47 g (~5.4 mmol) 1,2-epoxy-2-methylbutane, and ~6.75 g $d_6$-DMSO. After heating for ~2 days at ~75° C., about 30% of the amine sites had been selectively monoepoxylated according to $^{13}$C NMR (detailed hereinbelow). The sample was heated for an additional ~2 days at ~75° C. (~71% monoepoxylation); minor byproducts assignable to at least two separate species were observed beginning at about Day 3. After an interim ~5 day storage period at room temperature (~20-25° C.), the tube was again heated to ~75° C. for an additional ~7 days. Unreacted amine and unreacted epoxide were still observed in the mixture. Relevant Day 2 $^{13}$C NMR assignments (ppm): ~72.93 (unreacted amine —OCH$_2$—), ~71.03 (epoxylated product quaternary carbon), ~70.43 (epoxylated product amine —O$\underline{C}$H$_2$—), ~69.91 (unidentified CH$_2$, does not scale with product), ~58.90 (epoxylated product butyl —N$\underline{C}$H$_2$C<), ~57.04 (unreacted epoxide quaternary carbon), ~52.29 (unreacted epoxide —$\underline{C}$H$_2$(O)—), ~49.62 (epoxylated product amine —$\underline{C}$H$_2$N<), ~41.44 (unreacted amine —$\underline{C}$H$_2$N<), ~32.34 (epoxylated product —$\underline{C}$H$_2$CH$_3$), ~28.91 (unreacted epoxide —$\underline{C}$H$_2$CH$_3$), ~24.68 (epoxylated product —$\underline{CC}$H$_3$), ~20.33 (unreacted epoxide —$\underline{CC}$H$_3$), ~9.01 (unreacted epoxide —CH$_2$$\underline{C}$H$_3$), and ~8.11 (epoxylated product —CH$_2$$\underline{C}$H$_3$).

A similar procedure was carried out using about 6, rather than about 2, equivalents of 1,2-epoxy-2-methylbutane. After ~3 days at ~75° C., the $^{13}$C NMR spectrum showed selective formation of the monoepoxylated product described above. However, the abovementioned byproducts and unreacted 2,2'-oxybis(ethylamine) were still observed.

Example 10. A Selective Modification of DAOP with Styrene Oxide

A procedure similar to that described in Example 7 was carried out using ~0.254 g (~2.44 mmol) DAOP, ~0.574 g (~4.78 mmol) styrene oxide, and ~7.40 g d$_6$-DMSO. After ~5 days stirring at ~75° C., the $^{13}$C NMR/DEPT-135 spectra showed four major types of aromatic quaternary carbon in the ~145-140 ppm region, indicating aselective product formation. The mixture was heated at ~75° C. for an additional ~2 days, but no change in the $^{13}$C NM R spectrum was observed.

Example 11. Reaction of Reduced-Primary-Amine PEIs with CO$_2$ in d$_6$-DMSO

The PEI of Example 6 (~1.0 g) was reacted with cyclohexene oxide (~0.93 g, ~9.4 mmol) in a Schlenk tube in d$_6$-DMSO (~10.9 g) at ~75° C. for ~3 days, after which the solution was observed to be brown with some solids. The temperature was raised to ~100° C. for an additional ~16 hours. A portion of the sample was removed and treated with vacuum to remove unreacted cyclohexene oxide. The vacuum-treated product was then re-dissolved in DMSO at ~15 wt % concentration (some suspended solids were again observed): $^{13}$C NMR analysis indicated that only a portion of the primary amines had been monoepoxylated. The remainder of the sample was heated at ~100° C. for an additional ~8.5 days, after which $^{13}$C NMR analysis showed substantially all cyclohexene oxide had reacted, although some primary amine groups were still present.

Subsequently, a similar procedure was carried out using ~1.0 g of the PEI of Example 6, ~1.75 g (~17.9 mmol) cyclohexene oxide, and ~9.92 g d$_6$-DMSO at ~75° C. for ~3 days (after which the solution was observed to be dark brown with increased solids), then at ~100° C. for 16 more hours. A portion of the sample was removed and treated with vacuum to remove unreacted cyclohexene oxide. The vacuum-treated product was then re-dissolved in DMSO at ~15 wt %/o concentration (some suspended solids were again observed). $^{13}$C NMR analysis indicated that substantially all of the primary amines and a portion of the secondary amines had been monoepoxylated.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A $CO_2$-sorbent composition comprising a reaction product of a monoepoxide and a polyalkyleneimine oligomer in a non-aqueous aprotic liquid,
   wherein the monoepoxide is an aliphatic alkyleneoxide having from 4 to 12 carbon atoms,
   wherein the polyalkyleneimine oligomer is linear, cyclic, and/or branched and has the following repeat unit structure: —[(CH$_2$)$_x$—NR]$_y$—, where x is from 2 to 6, where y is from 4 to 50, and where R is hydrogen, an alkyleneamine branch having the structure —(CH$_2$)$_x$—NR$_2$, or an alkyleneimine branch having the structure —(CH$_2$)$_x$—NR'$_2$, wherein a first R' is either an alkyleneamine branch or another alkyleneimine branch and a second R' is hydrogen, another alkyleneamine branch, or yet another alkyleneimine branch,
   wherein the reaction product comprises one or more secondary amines and one or more tertiary amines, as well as one or more secondary hydroxyl groups,
   wherein the non-aqueous aprotic liquid is polar and has a dipole moment (D) of at least 1.7, and
   wherein the composition has a viscosity at about 25° C. of about 5 cPs or less and a $CO_2$ adsorption efficiency of at least 0.5:1 moles $CO_2$/moles of primary plus secondary amine.

2. A $CO_2$-sorbent complex comprising a reversible chemisorption complex of $CO_2$ with a composition comprising a reaction product of a monoepoxide and a polyalkyleneimine oligomer in a non-aqueous aprotic liquid,
   wherein the monoepoxide is an aliphatic alkyleneoxide having from 4 to 12 carbon atoms,
   wherein the polyalkyleneimine oligomer is linear, cyclic, and/or branched and has the following repeat unit structure: —[(CH$_2$)$_x$—NR]$_y$—, where x is from 2 to 6, where y is from 0.4 to 50, and where R is hydrogen, an alkyleneamine branch having the structure —(CH$_2$)$_x$—NH$_2$, or an alkyleneimine branch having the structure —(CH$_2$)$_x$—NR'$_2$, wherein a first R' is either an alkyleneamine branch or another alkyleneimine branch and a second R' is hydrogen, another alkyleneamine branch, or yet another alkyleneimine branch,
   wherein the reaction product comprises one or more secondary amines and one or more tertiary amines, as well as one or more secondary hydroxyl groups,
   wherein the non-aqueous aprotic liquid is polar and has a dipole moment (D) of at least 1.7,
   wherein the composition has a viscosity at about 25° C. of about 5 cPs or less and a $CO_2$ adsorption efficiency of at least 0.5:1 moles $CO_2$/moles of primary plus secondary amine, and
   wherein the chemisorption complex is reversible at a temperature between 25° C. and 150° C. and includes one or more carbamic acid groups and/or one or more carboxylates of carbamic acid groups formed from interaction between the $CO_2$ and the primary and/or secondary amines of the composition.

* * * * *